US007630095B2

(12) United States Patent
Tarumi

(10) Patent No.: US 7,630,095 B2
(45) Date of Patent: Dec. 8, 2009

(54) INFORMATION PROCESSING APPARATUS AND INFORMATION PROCESSING METHOD

(75) Inventor: Takeshi Tarumi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 647 days.

(21) Appl. No.: 11/398,407

(22) Filed: Apr. 5, 2006

(65) Prior Publication Data

US 2006/0227374 A1    Oct. 12, 2006

(30) Foreign Application Priority Data

Apr. 8, 2005    (JP)    .............................. 2005-112466

(51) Int. Cl.
*H04N 1/40*    (2006.01)
(52) U.S. Cl. ...................................... 358/1.15; 358/468
(58) Field of Classification Search ................ 358/1.9, 358/2.1, 1.15, 1.18, 468, 444, 403, 984, 498
See application file for complete search history.

(56) References Cited

U.S. PATENT DOCUMENTS 7,345,780 B2 *    3/2008    Seto ........................... 358/1.15
7,360,696 B2 *    4/2008    Iriuchijima ................. 235/383

FOREIGN PATENT DOCUMENTS

JP    2002-108596 A    4/2002

* cited by examiner

*Primary Examiner*—Thomas D Lee
*Assistant Examiner*—Stephen M Brinich
(74) *Attorney, Agent, or Firm*—Canon USA Inc IP Div

(57) ABSTRACT

To reduce the work load in sheet cassette exchange operations without changing a print processing order, a printing system can schedule the exchange operations so that a sheet type to be used latest among sheet types presently set in a printer can be designated as an exchange object. Furthermore, according to user's preference, the printing system can prohibit immediate exchange of sheet cassettes or realize simultaneous exchange of plural sheet types.

39 Claims, 21 Drawing Sheets

FIG.10

| SHEET TYPE | A | B | D | E | C | F | B | D | C | A | F | E | |
|---|---|---|---|---|---|---|---|---|---|---|---|---|---|
| A | ▨ →E | | | | | | | | | ▨ | | | A→E — 1001 |
| B | | ▨ | | | | | ▨ →C | | | | | | E→C — 1002 |
| C | | | | | ▨ →F | ▨ | | | ▨ | | | | C→F — 1003 |
| D | | | ▨ | | | | | ▨ →A | | | | | B→C — 1004 |
| E | | | | ▨ →C | | | | | | | | ▨ | D→A — 1005 |
| F | | | | | | | | | | | | | C→E — 1006 |

REQUIRED SHEETS AND ORDER IN PRINT JOB

FIG.11

| SHEET TYPE | A | B | D | E | C | F | B | D | C | A | F | E |
|---|---|---|---|---|---|---|---|---|---|---|---|---|
| A | →E | | | | | | | | | | | |
| B | | | | | →C | | | | | | | |
| C | | | | | | →F | | | →E | | | |
| D | | | | | | | | →A | | | | |
| E | | | | | | | | | | | | |
| F | | | | | | | | | | | | |
| A | | | | | | | | | | | | |
| B | | | | | | | | B→C | | | | |
| C | | | | | | C→F | | | C→E | | | |
| D | | | | | | | | D→A | | | | |
| E | | | | | | E→C | | | | | | |

1106: A→E
1107: E→C
1101: REQUIRED SHEETS AND ORDER IN PRINT JOB
1102, 1103, 1104, 1105

FIG.13

| SHEET TYPE | A | B | D | E | C | F | B | D | C | A | F | E |
|---|---|---|---|---|---|---|---|---|---|---|---|---|
| A | ▨ →E | | | ▨ | | | | | | ▨ | | |
| B | | | ▨ | ▨ | ▨ | ▨ | ▨ →A | | | | | |
| C | | | | | ▨ →C | | | | ▨ | | | ▨ →E |
| D | | | | ▨ →F | | | | ▨ | ▨ | | | |
| E | | | | | | | | | | | | ▨ |
| F | | | | | →F | ▨ | | →D | | | ▨ | |
| | A→E | | D→C | E→F | | F→D | B→A | D→F | C→E | | | |

REQUIRED SHEETS AND ORDER IN PRINT JOB

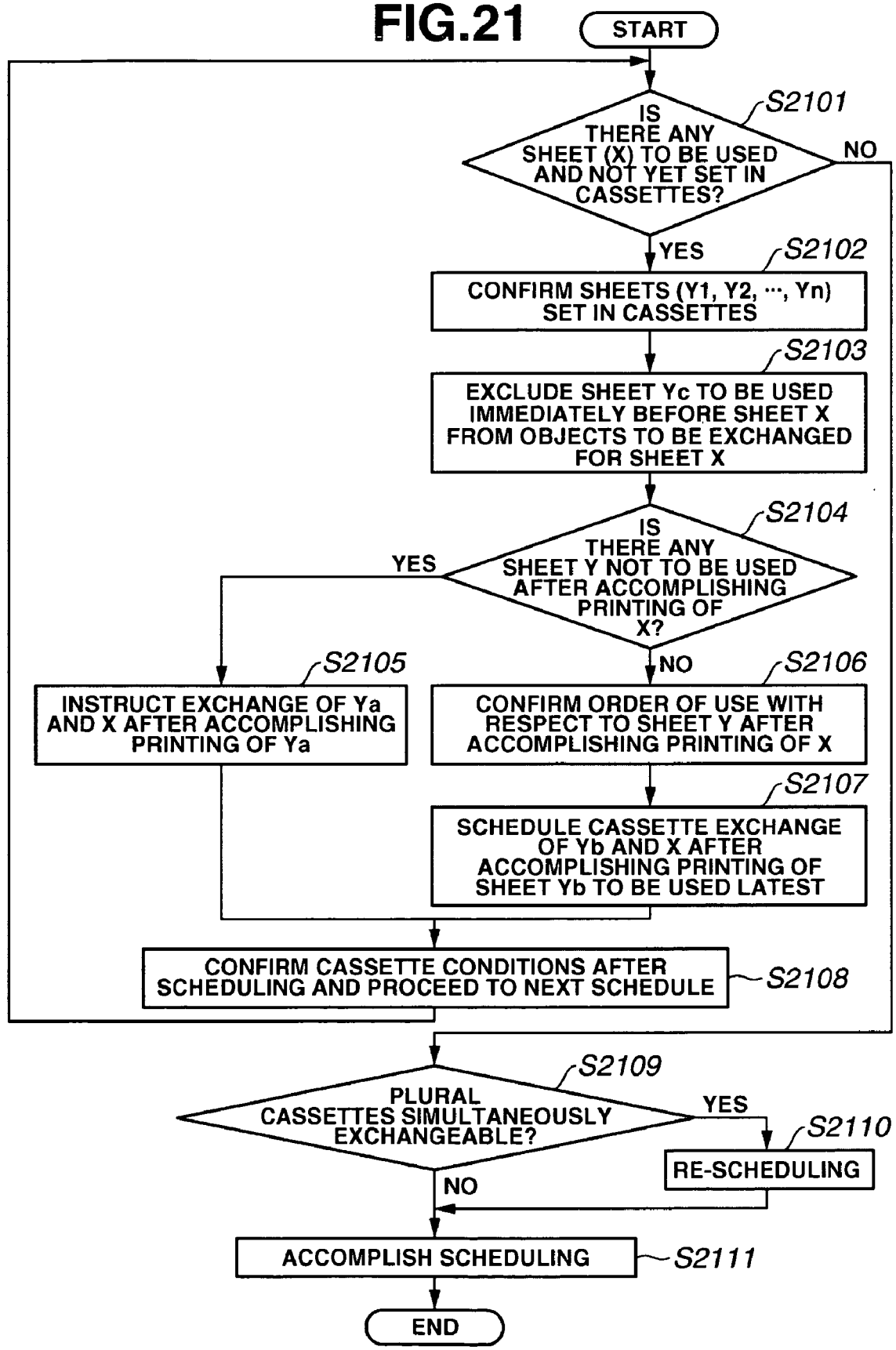

INFORMATION PROCESSING APPARATUS AND INFORMATION PROCESSING METHOD

BACKGROUND OF THE INVENTION

1. Field of the Invention

The present invention relates to an information processing apparatus and an information processing method, and more particularly to an image forming apparatus that can perform image forming processing, a related image forming method, a related program, an information processing apparatus that can produce print job data processible by the image forming apparatus, a related information processing method, and a related program.

2. Description of the Related Art

The business flow of conventional print industries includes fundamental phases of receiving an order from a customer (or a client), producing print products (e.g., magazines, newspapers, catalogs, advertisement prints, gravures, etc.) according to the order, and delivering the finished products to the customer (or client). Many of conventional printing companies are still using large scale printing devices, such as offset type printing machines. The printing work according to a conventional printing method includes various processes, such as document reception, design, layout, composition (presentation based on a printer output), correction (layout correction or color correction), proof (proof print), block copy preparation, printing, post-processing treatment, and delivery. The offset type printing machine requires, as a mandatory step, preparing a block copy. When a block copy is finished, correcting the block copy is not easy. Complicated correction, if performed at a later time, increases the total manufacturing cost. Accordingly, the printing work according to the conventional printing method requires careful corrections, including check of the layout and confirmation of colors.

In this manner, the conventional printing method requires a large scale device and sufficient lead time to finish the print works as requested by the customer or client. Furthermore, these works require specialized knowledge or know-how.

On the other hand, electro-photographic printing devices and inkjet printing devices can provide high speed and high quality outputs. To develop a new market for digital print based on electronic data, a new business model, so called "Print On Demand (referred to POD)", has recently appeared as handling a relatively smaller lot of jobs and finishing the job in a short period of time without using a large scale device or system, for example, by fully utilizing a digital image forming apparatus, such as a digital copy machine or a digital multi function peripheral.

In such a POD market, computer-based management and controls are the keys to promote the digitization in various printing processes and catch up the conventional print industries. For example, PFP (Print For Pay) and CRD (Centralized Reproduction Department) are included in the POD market. The PFP is the print service directed to a copy/print shop or print company. The CRD is the print service directed to an in-house section of a company.

The print services and commodities have the capability of covering the entire field of the business including reception of an order, packing, delivery, after-service, inventory management, and payment management.

Furthermore, the capability of collecting production related data, processing the collected data, and reporting the analysis will provide an efficient supporting system for corporate planning and management. Furthermore, a system capable of storing the information and timely providing the information to an appropriate section will be required in the future.

It is generally difficult to keep skilled workers in the POD market, compared with the conventional print industries. However, satisfying various requirements, such as accomplishing a print job at a low cost, starting the business with a small investment, and reducing the TCO (Total Cost of Ownership), is the goal of this new market.

As described above, the POD market can speedily provide print products in response to various types of print orders. For example, a requested order may designate the use of plural sheets (sheet types) for not only plural jobs but also a single job. If the number of sheet types required in a job exceeds a total number of paper feeding sections (i.e., paper cassettes) of a printing device, an operator must re-arrange the sheets (sheet types) in the printing device in response to every occurrence of a sheet exchange request error.

Considering the inconvenience in a complicated job, the operator of the printing device can prepare plural spare sheet cassettes storing the rest of required sheets (sheet types) in addition to the built-in cassettes originally equipped in the printing device. However, this method is not so effective in that the operator of the printing device must frequently exchange the cassettes every time a sheet exchange request error occurs.

Japanese Patent Application Laid-Open No. 2002-108596 proposes a technique capable of reducing the work load in such cassette exchange operations, according to which the cassettes of plural sheet types are set and exchanged according to a predetermined priority order. However, according to the method proposed in Japanese Patent Application Laid-Open No. 2002-108596, the print order is frequently changed because the print order is dependent on priority.

For example, even if a customer requests the print processing performed in the order of sheet A→sheet B→sheet C, the actual print processing will be differently performed (e.g., in the order of sheet C→sheet B→sheet A) unless the customer's request matches the sheet priority. In such a case, the operator must additionally work to correct the page order of the printed product as requested. This will deteriorate the operability of the operator.

Furthermore, in the case of receiving many print requests at the same time, it is desirable to set a schedule for processing print jobs considering their delivery data or device performances before starting the print processing. However according to the method proposed in Japanese Patent Application Laid-Open No. 2002-108596, such scheduling cannot be realized because the final print processing order is substantially determined according to the sheet priority.

SUMMARY OF THE INVENTION

The present invention is directed to a printing system and a print method that can reduce the work load in the sheet cassette exchange operations without deteriorating the user's operability.

One aspect of the present invention provides an image forming apparatus that performs print processing based on print job data transmitted from an information processing apparatus that can produce the print job data. The image forming apparatus includes an information acquiring unit, a judging unit, a decision unit, and a display unit. The information acquiring unit obtains, based on the print job data, information relating to a sheet type required in the print processing and a print order of the required sheet type. The judging unit determines whether the required sheet type obtained by the information acquiring unit is initially set in the image forming apparatus. The decision unit decides, based on the print order of the required sheet type obtained by the information acquiring unit, exchange object information relating to a sheet type later used but not initially set in the image forming apparatus, responsive to the judging unit determining that the required sheet type is not initially set in the image forming apparatus. The display unit displays information relating to exchange processing for the sheet type later used but not initially set in the image forming apparatus, based on the exchange object information decided by the decision unit.

Another aspect of the present invention provides an image forming method for an image forming apparatus that performs print processing based on print job data transmitted from an information processing apparatus, including an information acquiring step of obtaining, based on the print job data, information relating to a sheet type required in the print processing and a print order of the required sheet type, a judging step of determining whether the required sheet type obtained in the information acquiring step is initially set in the image forming apparatus, a decision step of deciding, based on the print order of the required sheet type obtained in the information acquiring step, exchange object information relating to a sheet type later used but not initially set in the image forming apparatus, responsive to determining in the judging step that the required sheet type is not initially set in the image forming apparatus, and a displaying step of displaying information relating to exchange processing for the sheet type later used but not initially set in the image forming apparatus, based on the exchange object information decided in the decision step.

Another aspect of the present invention provides a computer-readable medium having stored thereon a computer program comprising a program code having computer-executable program instructions processible, in an image forming apparatus that performs print processing based on print job data transmitted from an information processing apparatus that can produce the print job data, to execute the image forming method provided above.

Another aspect of the present invention provides an information processing method for an information processing apparatus including an information acquiring step of obtaining, based on the print job data, information relating to a sheet type required in the print processing and a print order of the required sheet type, a judging step of determining whether the required sheet type obtained in the information acquiring step is initially set in the image forming apparatus, a decision step of deciding, based on the print order of the required sheet type obtained in the information acquiring step, exchange object information relating to a sheet type later used but not initially set in the image forming apparatus, responsive to determining in the judging step that the required sheet type is not initially set in the image forming apparatus, and a displaying step of displaying information relating to exchange processing for the sheet type later used but not initially set in the image forming apparatus, based on the exchange object information decided in the decision step.

Further features of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 10 is a diagram showing a sheet cassette exchanging schedule in accordance with the embodiment of the present invention.

FIG. 11 is a diagram showing details of the sheet cassette exchanging schedule in accordance with the embodiment of the present invention.

FIG. 13 is a diagram showing the sheet cassette exchanging schedule in accordance with the embodiment of the present invention.

FIG. 17A is a diagram showing the scheduling of sheet cassette exchange operations in accordance with the embodiment of the present invention.

FIG. 17B is a diagram showing the result of timing adjustment optimizing the sheet cassette exchange operations in accordance with the embodiment of the present invention.

FIG. 21 is a flowchart showing a flowchart of a second scheduling method performed in response to selection of an item "prohibit sheet cassettes from being exchanged immediately before use" in accordance with the embodiment of the present invention.

DETAILED DESCRIPTION OF THE EMBODIMENTS

The following description of exemplary embodiment(s) is merely illustrative in nature and is in no way intended to limit the invention, its application, or uses. Exemplary embodiments can be incorporated into various imaging systems as known by one of ordinary skill. Processes, techniques, apparatus, and materials as known by one of ordinary skill in the art may not be discussed in detail but are intended to be part of the enabling description where appropriate. Exemplary embodiments of the invention will be described in detail below with reference to the drawings.

First Embodiment (System Arrangement)

Figure 1:
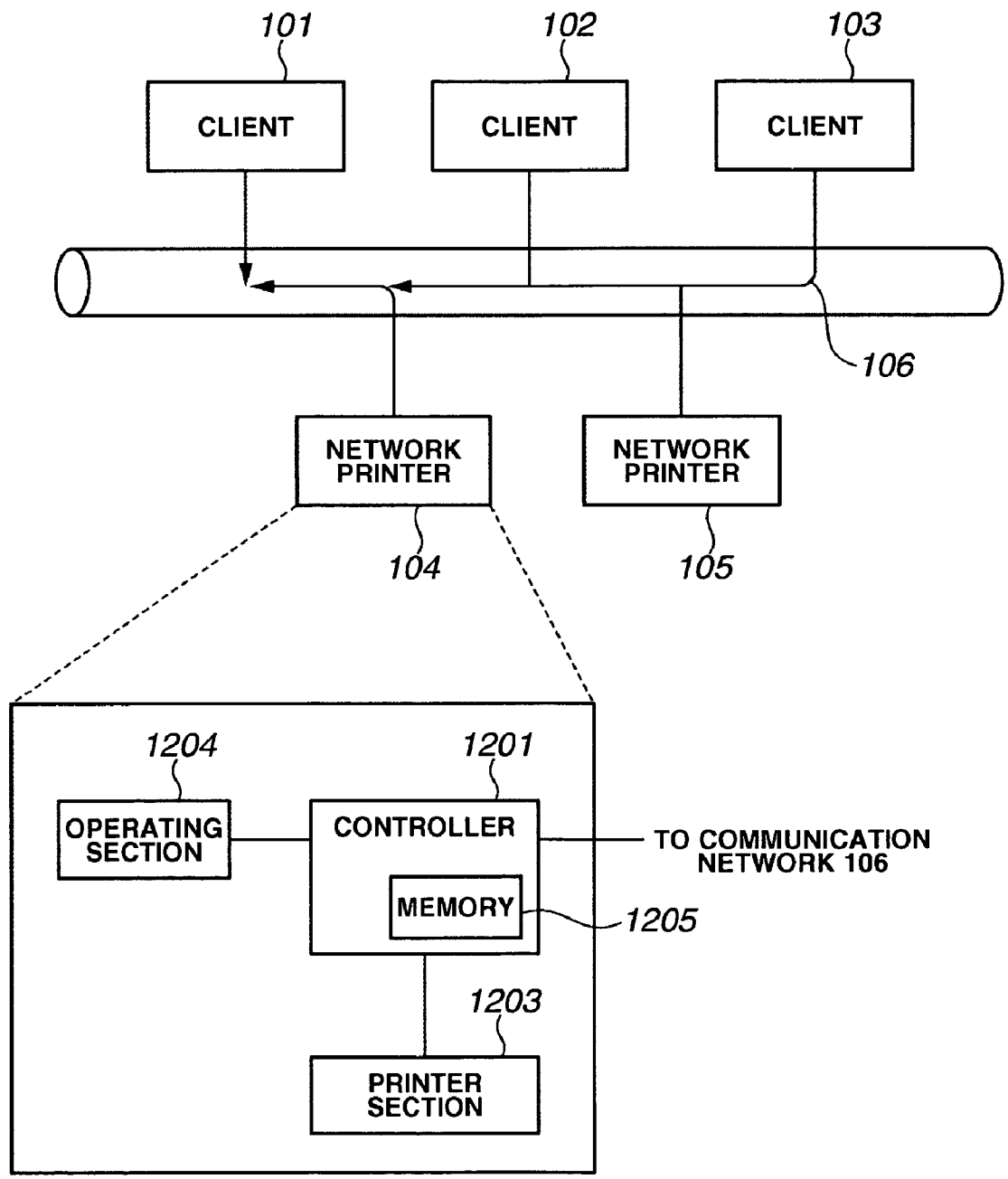
FIG. 1 is a block diagram showing an overall arrangement of a printing system in accordance with one embodiment of the present invention.

FIG. 1 is a block diagram showing an overall arrangement of a printing system in accordance with a first embodiment of the present invention. The printing system includes plural clients (computers) 101 to 103 respectively acting as an information processing apparatus, plural network printers 104 and 105 respectively acting as a printing device, and a communication network 106 connecting the clients 101 to 103 and the network printers 104 and 105 so as to constitute a network as a whole.

Each client (computer) 101 to 103, storing and executing a print control program, can manage the network printers 104 and 105 of the printing system, store various files usable in the network, and monitor the conditions of the network. More specifically, each client (computer) 101 to 103 can produce print job data and transfer the print data to the network printers 104 and 105.

The network printers 104 and 105, i.e., printing devices, can receive print job data including print data from the clients (computers) 101 to 103, and can analyze the received print job data to print the data. The network printers 104 and 105 are, for example, laser beam printers employing the electro-photographic technology, inkjet printers, and heat transfer type printers, or can be any other printing devices.

Furthermore, the network printers 104 and 105 can accept print requests from respective clients (computers) 101 to 103, can determine the print order among the accepted print requests, and can issue print instructions. Furthermore, the network printers 104 and 105 can monitor the print job data transferred from the clients (computers) 101 to 103 as well as their operating conditions, and notify the clients (computers) 101 to 103 of completion of the print job and printer conditions.

The communication network 106 of the printing system can be provided by an Ethernet® cable or other wire communication tool, or wireless communication tool using radio wave of light.

FIG. 1 is a block diagram of the network printer 104 acting as one example of the network printer. The network printer 104 of the first embodiment includes a controller 1201 controlling the network printer 104; a printer section 1203, and an operating section 1204. The controller 1201 includes a CPU (central processing unit), although not shown in the drawing, and a memory 1205, such as a RAM (work area). The CPU can execute image processing for the image instructed by the print job data. The memory 1205 can store the result of image processing. Furthermore, the CPU can read image data from the memory 1205 and can control the operating section 1204 and the printer section 1203. The CPU of the controller 1201 can read control programs from a ROM of the memory 1205 to perform various controls.

The operating section 1204 can allow a user to input various print conditions for the image instructed by the print job data and also allows the user to set various functions of the network printer 104. The operating section 1204 includes a liquid crystal display section, and a touch panel and plural hard keys (i.e., input devices) attached on the liquid crystal display section. The CPU of the controller 1201 can input signals or instructions entered by a user through the touch panel or hard keys. The liquid crystal display section can display image data transmitted from the CPU of the controller 1201. The liquid crystal display section can display functions relating to the operation of the network printer 104 as well as image data. Detailed display performed according to the first embodiment will be described below with reference to FIGS. 15 and 16.

The printer section 1203 can print the image data read out from the memory 1205 on a recording sheet according to the printing conditions set by the operating section 1204. Furthermore, the network printer 104 can communicate via the communication network 106 with a server (not shown) that manages image data or with respective clients (computers) 101 to 103 that instruct execution of the print job.

Figure 2:
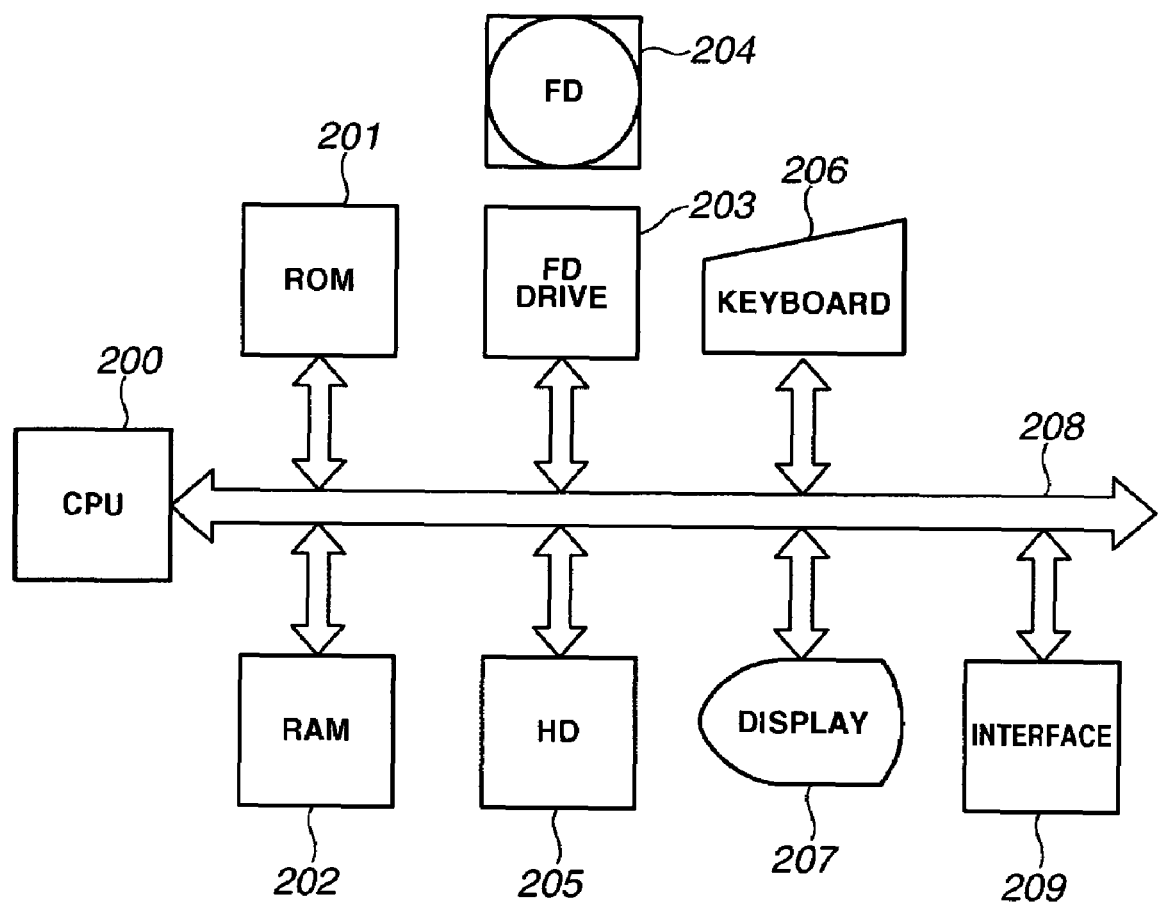
FIG. 2 is a block diagram showing a hardware arrangement of a client in accordance with one embodiment of the present invention.

FIG. 2 is a block diagram showing a hardware arrangement of each client (computer) 101 to 103 shown in FIG. 1. In FIG. 2, a CPU 200 is a control unit that can read and execute application program(s), printer driver program(s), OS (operating system), or print control program(s) stored in an HD (i.e., hard disk) 205. A RAM (random access memory) 202 can temporarily store information and file(s) required to execute the program(s).

A ROM (read only memory) 201 is a memory unit that can store a BIOS (basic input/output system) and other programs as well as various data including font data for the document processing, and template data. The RAM 202 is a temporary storage unit that can function as a main memory or a work area of the CPU 200.

Figure 5:
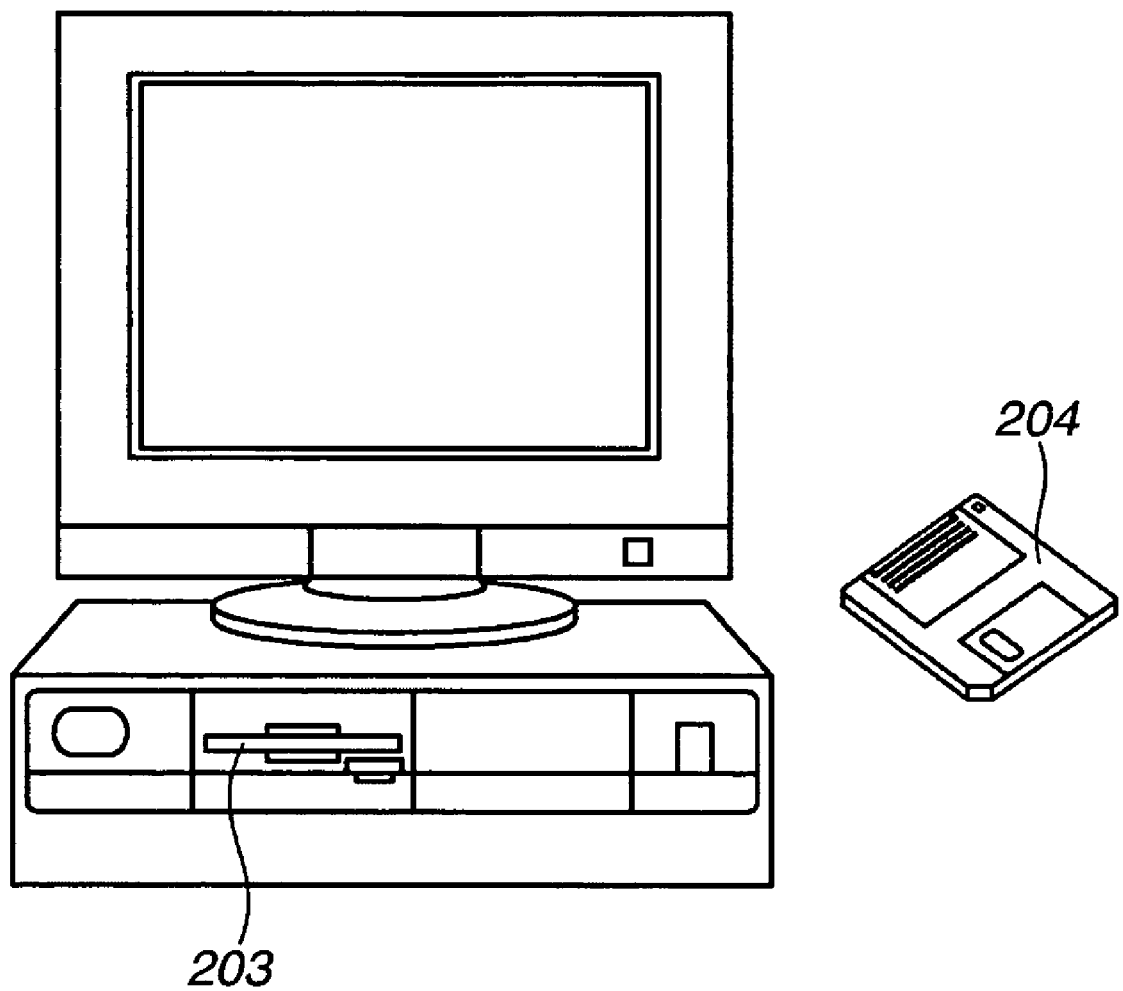
FIG. 5 is a diagram showing an FD and an FD drive in accordance with one embodiment of the present invention.

An FD (floppy disk) drive 203 is a storage medium reading unit that can load program(s) or the like from an FD 204 (i.e., storage medium) to the computer system as shown in FIG. 5. Each client (computer) 101 to 103 can be equipped with other storage medium reading unit in addition to the FD drive 203 or instead of the FD drive 203. For example, other storage medium can be selected from various types of storage media readable by a computer, including CD (compact disk)-ROM, CD-R (CD recordable), CD-RW (CD-Rewritable), PC (personal computer) card DVD (digital versatile disk), IC (integrated circuits) memory card, MO (magneto-optical disc), and memory stick.

The HD 205 is an external memory unit that can function as a large-capacity memory storing application program(s), printer driver program(s), OS, print control program(s), and other related program(s). Furthermore, the HD 205 can secure a spooler (i.e., spool unit). The client (computer) 101 to 103 can secure a spooler (i.e., spool unit).

A keyboard 206 is an instruction inputting unit that allows a user to input various instructions including control commands to the client (computer) 101 to 103.

A display 207 is a display unit that can display commands entered from the keyboard 206 and conditions of the printers 104 and 105. In practice, to realize each display, a display instruction is transmitted from the operating system of the client (computer) 101 to 103 to the display unit. A display instruction of a resource file is given to the operating system by the print processing program. A system bus 208 provides a data path for the clients (computers) 101 to 103.

An interface 209 is an input/output unit that controls data exchange between the client (computer) 101 to 103 and other device on the network.

Figure 3:
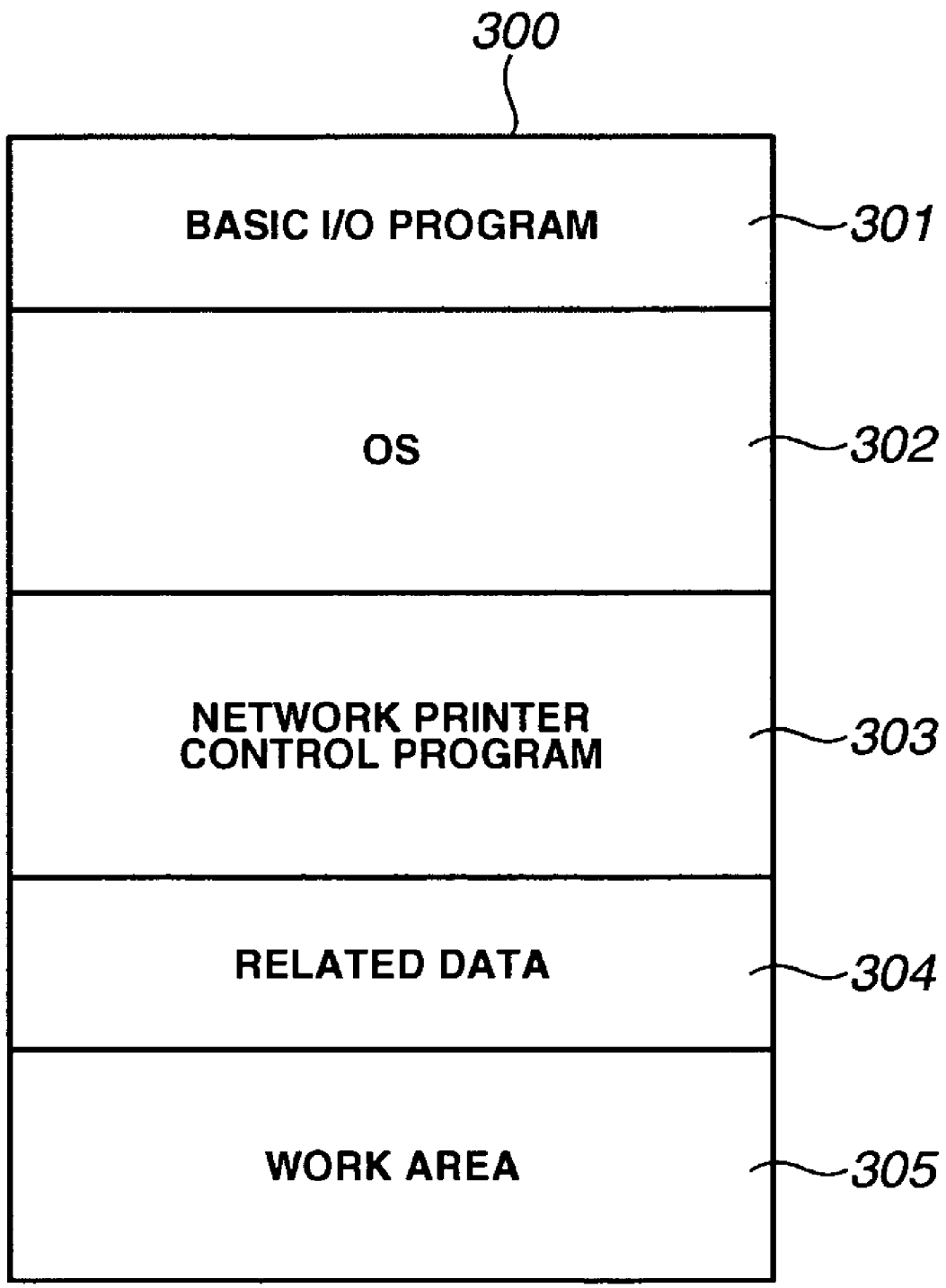
FIG. 3 is an exemplary diagram showing a memory map of RAM in accordance with one embodiment of the present invention.

FIG. 3 is an exemplary diagram showing a memory map 300 of the RAM 202 shown in FIG. 2, according to which the print control program is loaded to the RAM 202 and in an executable condition. The print control program and related data can be installed beforehand in the FD 204 or in the HD 205, or can be loaded from the HD 205 to the RAM 202, or can be directly loaded from the FD 204 to the RAM 202.

Furthermore, the print control program can be stored beforehand in the ROM 201, so as to constitute part of the memory map, and can be directly executed by the CPU 200. Furthermore, it is possible to use software capable of realizing functions equivalent to those of the above-described hardware devices.

The print control program enables the client to transfer the print data, change a print destination of the print job, or change the print order. The memory map 300 includes an area 301 storing a BIOS program, an area 302 storing an OS (operating system), an area 303 storing a print control program, an area 304 storing related data, and a work area 305 enabling the CPU 200 to execute various programs. The BIOS program has an IPL (initial program loading) function that enables the device (clients (computers) 101 to 103) to load the OS from the HD 205 to the RAM 202 in response to turning-on of the electric power source and start the operation of the OS.

Figure 4:
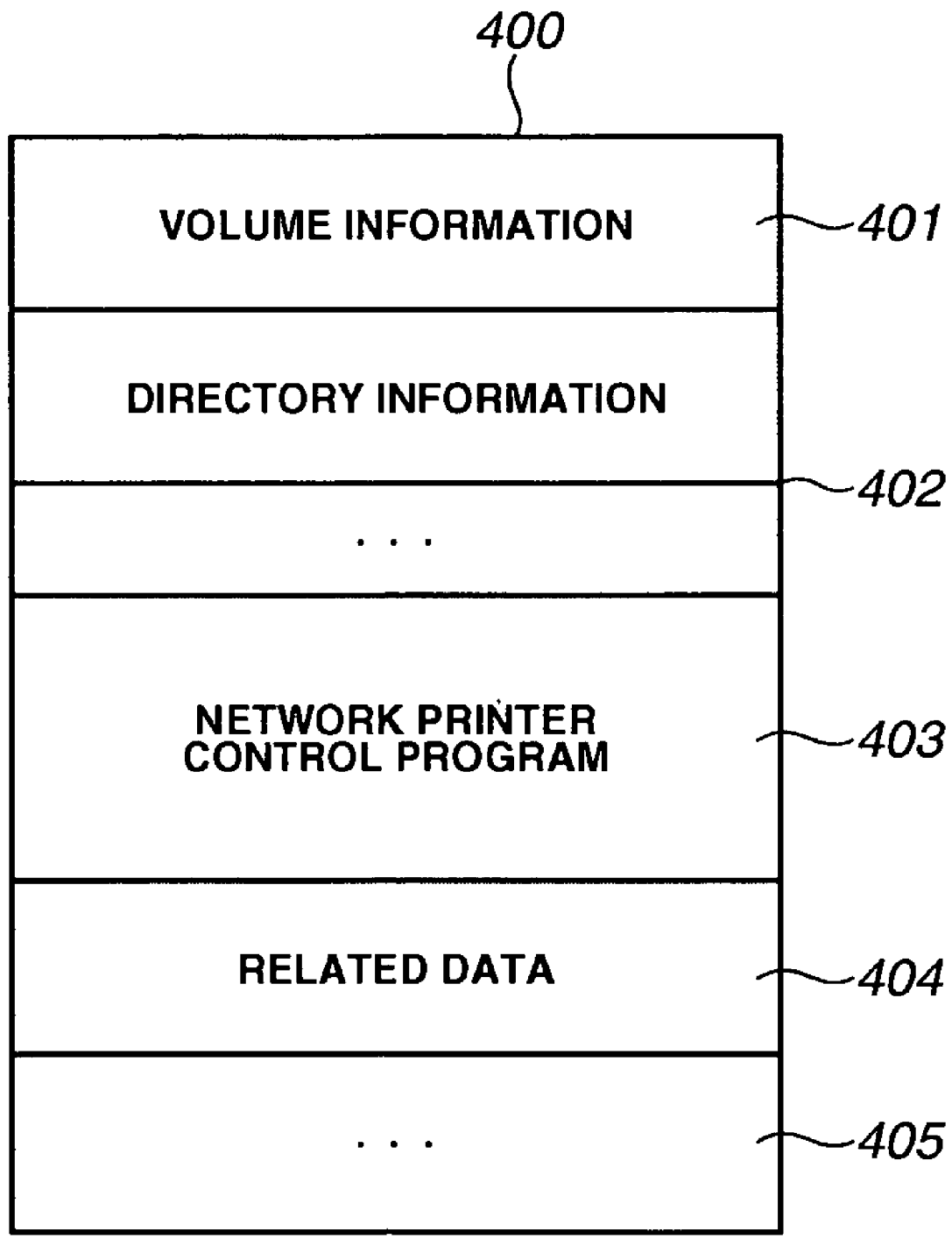
FIG. 4 is a diagram showing a memory map representing data arrangement in a floppy disk (FD) in accordance with one embodiment of the present invention.

FIG. 4 is an exemplary diagram showing a memory map 400 of the FD 204 shown in FIG. 2. The memory map 400 includes volume information 401 representing information of the data, directory information 402, network printer control program (i.e., print control program) 403, and related data 404. Each of the clients (computers) 101 to 103 has the network printer control program 403 according to the present embodiment.

As shown in FIG. 5, the FD 204 can be inserted into the FD drive 203 shown in FIG. 2 and can store the network printer control program and related data.

(Operation of the System)

Figure 6:
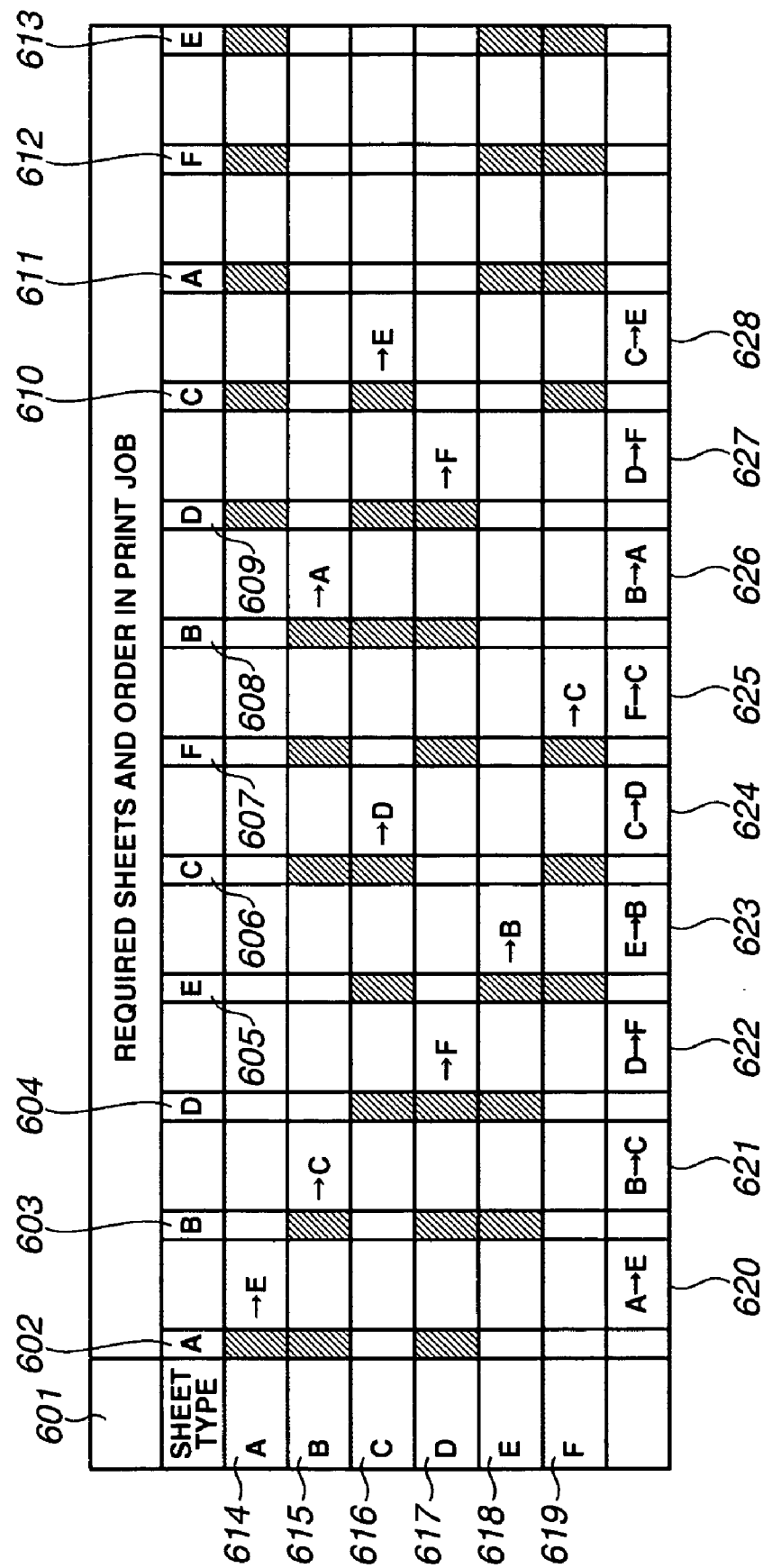
FIG. 6 is an exemplary diagram showing a conventional sheet cassette exchanging method.

The operation of the above-described printing system will be described below. First of all, for comparison purposes, a conventional printing system will be described. FIG. 6 is a diagram showing the cassette exchanging order and timing of a conventional network printer in a case that a printing system receives the data of one print job (i.e., print data of one print job designating the use of plural sheet types). According to the conventional printing system, used sheet cassettes are successively replaced with other ones. According to the example shown in FIG. 6, the print job requires a total of 6 sheet types from sheet A to sheet F while the only three types can be set together in the printer.

The shaded portion in FIG. 6 shows the sheet type being set in the printer. In the initial stage of the example shown in FIG. 6, the sheets being set in the printer are sheet A 614, sheet B 615, and sheet D 617. Furthermore, sheet types A through F are required in the description of the first embodiment (practically corresponding to A4, A3, B4, B5, carton board, and normal paper).

First, an operator confirms the order of sheets required in the print job. According to the example shown in FIG. 6, the order of required sheets is A→B→D→E→C→F→B→D→→A→F→E (602 to 613). The operator sets the initially required sheets in the cassettes of the network printer.

According to the example shown in FIG. 6, three sheet types A, B, and D are initially set in the printer.

After the network printer has finished one printing operation, the operator replaces the sheets not being used in the next printing operation with another type. According to the example shown in FIG. 6, the operator replaces the sheet A with the sheet E when the printing operation using the sheet A is accomplished. In this manner, the operator successively repeats the exchange of required sheets. The print job shown in FIG. 6 requires plural (a total of nine times of) sheet cassette exchanging operations, i.e., "A→E" 620, "B→C" 621, - - -, "C→E" 628.

Figure 7:
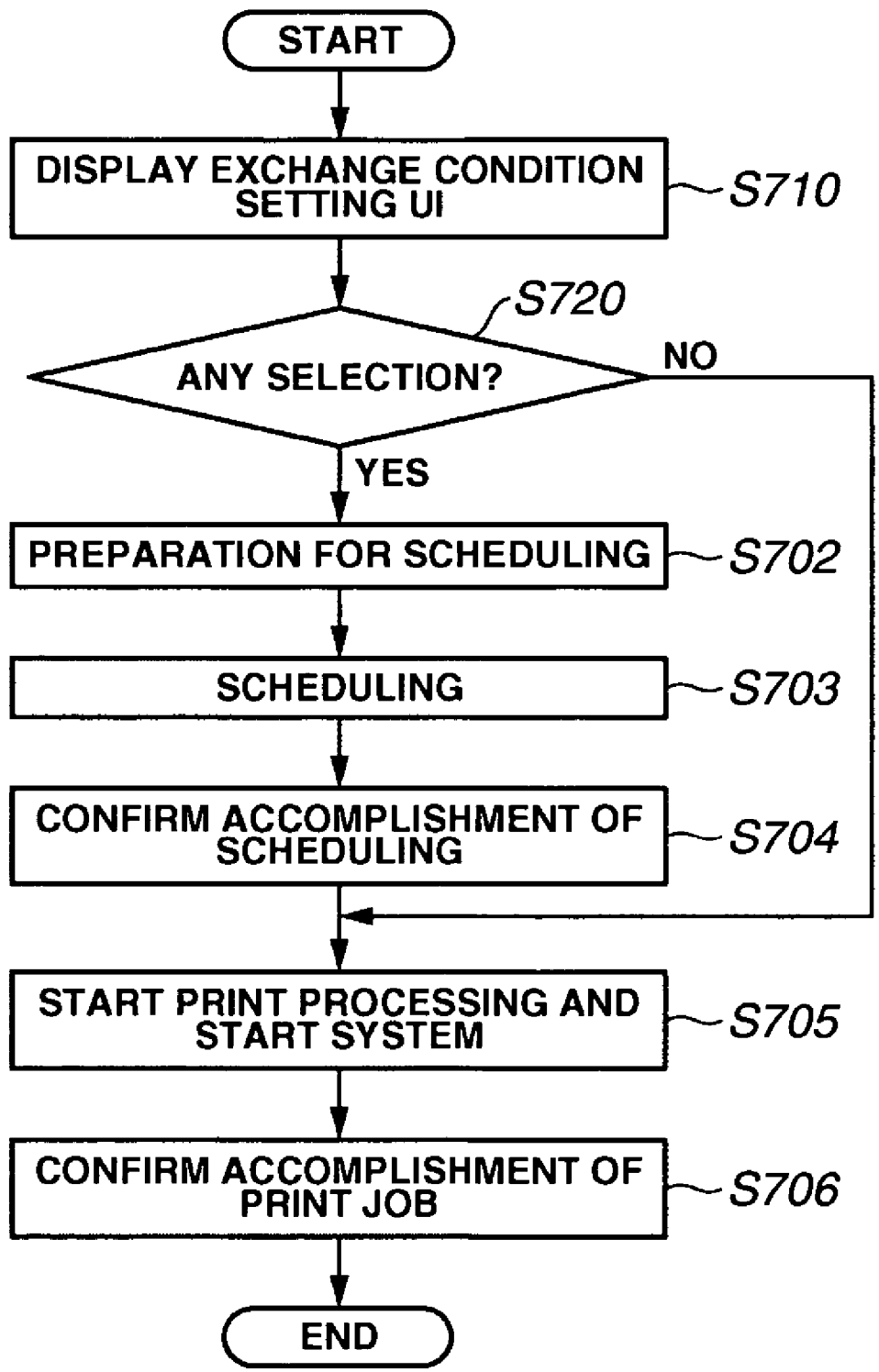
FIG. 7 is a flowchart schematically showing an operation of the printing system in accordance with the embodiment of the present invention.

FIG. 7 is a flowchart showing a schematic operation of the printing system according to the first embodiment. In the following description, the operation of the network printer is described as the operation of the network printer 104. The controller 1201 (i.e., CPU) of the network printer 104 shown in FIG. 1 reads the control program(s) from the memory 1205 and starts operation according to the flowchart shown in FIG. 7. The memory 1205 stores various data relating to the processing. The CPU of the controller 1201 executes the processing of each step in the flowchart.

When the network printer 104 receives the data of one print job (i.e., print data of one print job designating the use of plural sheet types), the controller 1201 (i.e., CPU) starts the operation according to the flowchart shown in FIG. 7. In step S710, the controller 1201 recognizes the presence of an instruction instructing display of a user interface (UI) that enables an operator to set conditions for the exchange of sheet cassettes, and displays the exchange condition setting UI on the operating section 1204. After the exchange condition setting UI is displayed, the operator can input instructions to the controller 1201.

Figure 15:
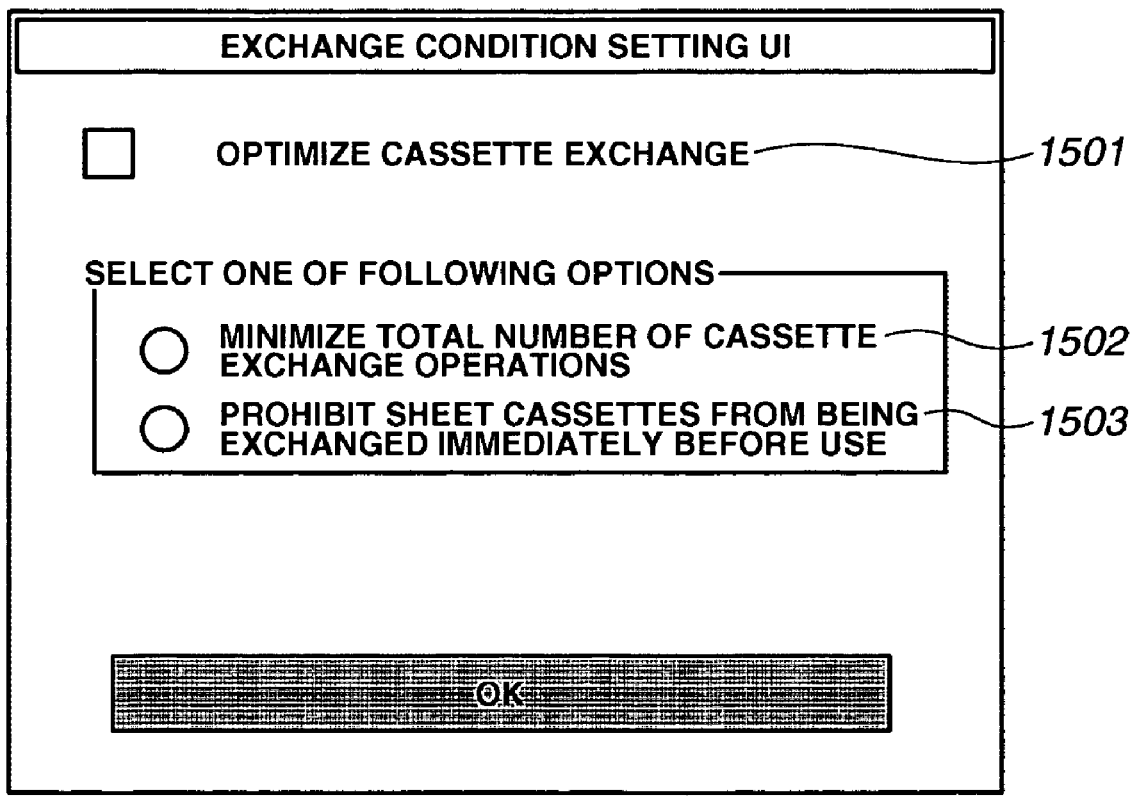
FIG. 15 is an exemplary diagram showing a user interface (UI) allowing an operator to set scheduling of sheet cassette exchange operations in accordance with the embodiment of the present invention.

FIG. 15 is an exemplary diagram showing a sheet cassette exchange condition setting UI displayed in step S710. The UI shown in FIG. 15 allows the operator to select one of optional items 1501 to 1503. The operator can depress an OK button when the operator has selected a desired item, to decide the conditions for the exchange of the sheet cassettes.

In FIG. 15, when the operator selects the item 1501 "optimize cassette exchange", the operator can subsequently select either the item 1502 or the item 1503. When the operator selects the item 1502 "minimize total number of cassette exchange operations", the scheduling according to a below-described scheduling method shown in FIG. 9 can be instructed. When the operator selects the item 1503 "prohibit sheet cassettes from being exchanged immediately before use", the scheduling according to a below-described scheduling method shown in FIG. 12 can be instructed.

When the controller 1201 detects the operator's depressing the OK button through the UI shown in FIG. 15, the processing routine proceeds to step S720. The contents being set by depressing the OK button on the UI shown in FIG. 15 can be automatically stored in the memory 1205 of the controller 1201.

When the operator has selected the item 1502 or the item 1503 on the UI of FIG. 15 (i.e., YES in step S720), the processing routine proceeds to step S702. When the operator has not selected either the item 1502 or the item 1503 (i.e., NO in step S720), the processing routine proceeds to step S705. More specifically, the memory 1205 stores the contents that the operator has set through the UI shown in FIG. 15. Thus, the controller 1201 accesses the memory 1205 to execute the processing of step S720.

In step S702, the controller 1201 reads the settings of the received print job data and reads the information relating to the required sheets (i.e., sheet types). Details of this processing will be described below with reference to FIG. 8. The memory 1205 stores the information relating to the sheet types read out in step S702.

In step S703, the controller 1201 confirms the information relating to the required sheets (sheet types) read out from the memory 1205 and starts the scheduling of sheet cassette exchange operations. In this case, the controller 1201 performs the scheduling according to the scheduling method shown in FIG. 9 when the operator has selected the item 1502 "minimize total number of cassette exchange operations" on the UI shown in FIG. 15. The controller 1201 performs the scheduling according to the scheduling method shown in FIG. 12 when the operator has selected the item 1503 "prohibit sheet cassettes from being exchanged immediately before use". The memory 1205 holds the scheduling result obtained in step S703.

In step S704, the controller 1201 confirms accomplishment of the scheduling and brings the system into a stand-by condition for the print processing. More specifically, the controller 1201 reads the information relating to the scheduling performed in the step S703 from the memory 1205, and controls the operating section 1204 to display a sheet cassette exchange instructing UI (refer to FIG. 16).

In step S705, the controller 1201 starts the print processing. In this case, the print processing starts according to the schedule if the schedule is set according to the scheduling performed in step S703. The controller 1201, when the operating section 1204 displays the sheet cassette exchange instructing UI, successively renews the UI according to the print situation (i.e., the progress of the schedule being set) to encourage the operator to exchange the sheet cassettes.

Figure 16:
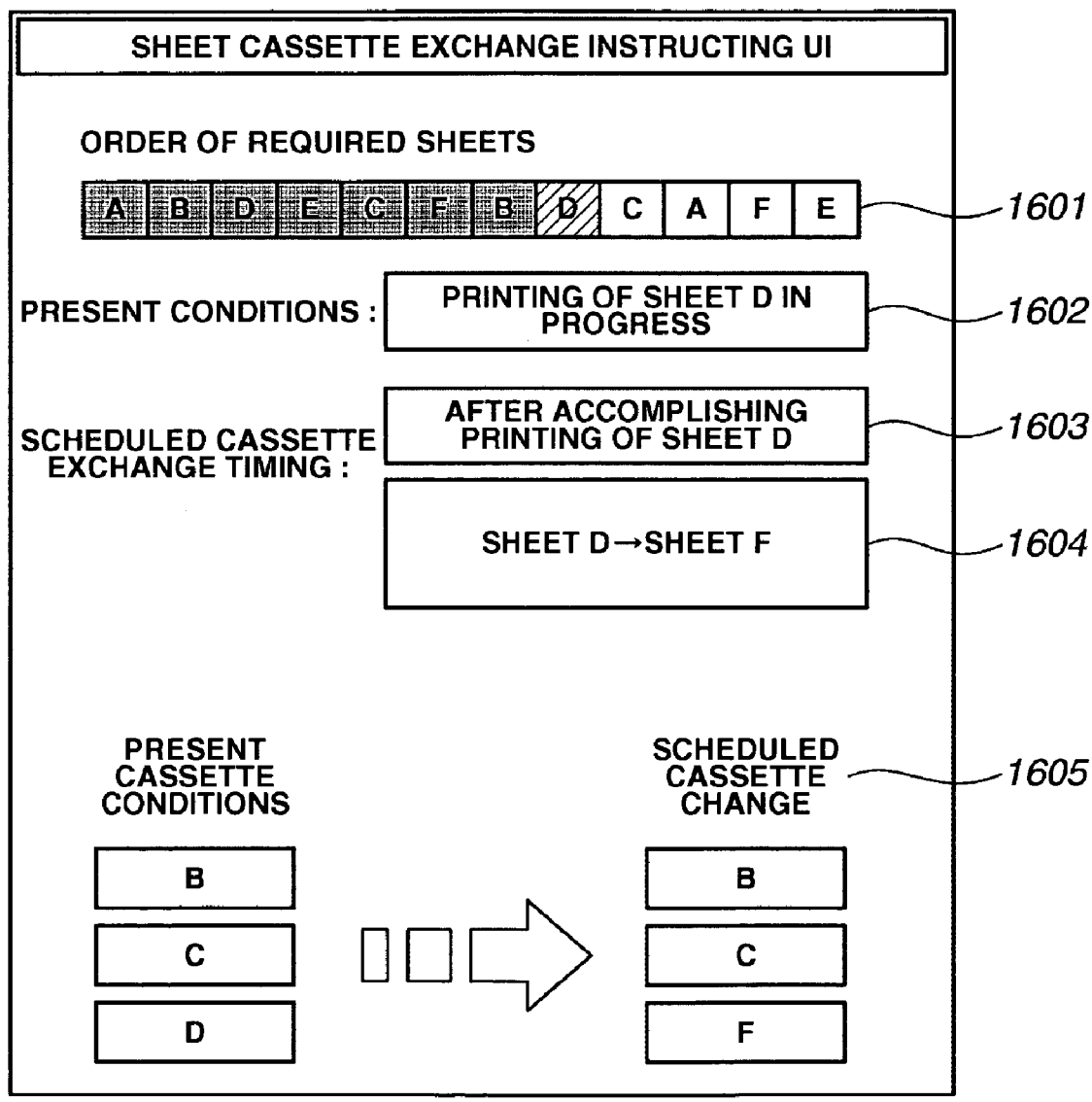
FIG. 16 is an exemplary diagram showing a sheet cassette exchange instructing UI in accordance with the embodiment of the present invention.

FIG. 16 is an exemplary diagram showing a sheet cassette exchange instructing UI displayed on the operating section 1204. The UI of FIG. 16 includes an item 1601 displaying the order of sheets (sheet types) required in the print job. More specifically, to let the operator easily confirm the progress of the job, a dark colored frame represents the sheet (sheet type) whose print processing has been already finished, a shaded frame represents the sheet (sheet type) whose print processing is currently in progress, and a light colored frame represents the sheet (sheet type) whose print processing is not yet started.

In FIG. 16, an item 1602 displays details of the present conditions. An item 1603 notifies the timing of the next sheet cassette exchange operation. An item 1604 displays the information relating to the objects (i.e., sheet types) to be exchanged. An item 1605 provides a graphical display showing the cassette exchange conditions. The exchange object information displayed in the item 1604 is not limited to the sheet types, and accordingly can be identification information of the paper feeding section (i.e., paper feeding cassette) that stores the sheets to be newly set.

In step S706, the controller 1201 confirms accomplishment of the print job, thereby terminating the processing routine shown in FIG. 7. In this case, the controller 1201 controls the operating section 1204 to display a UI other than those shown in FIGS. 15 and 16 before terminating the processing routine.

Figure 8:
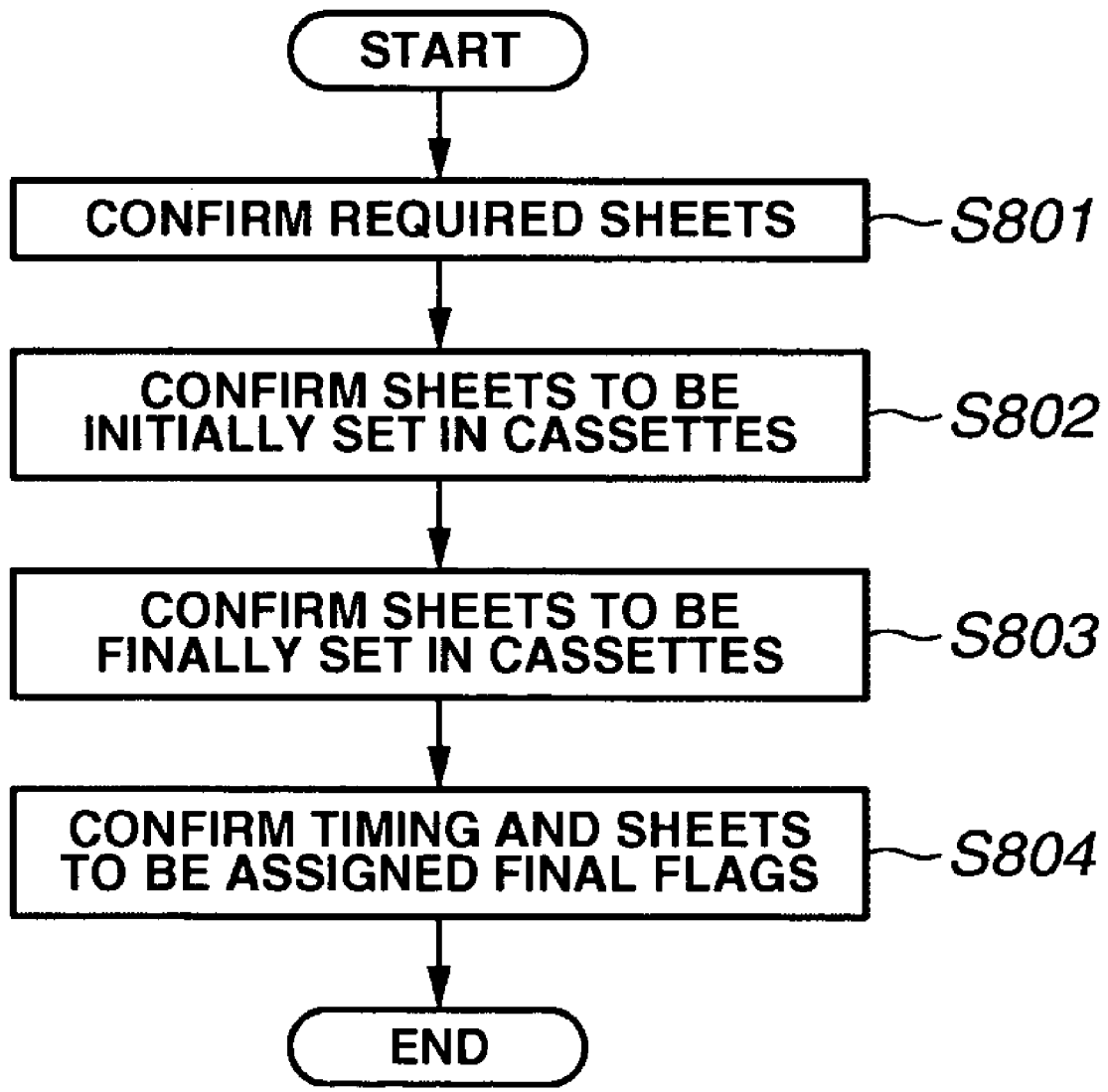
FIG. 8 is a flowchart showing detailed preparatory processing for the scheduling in accordance with the embodiment of the present invention.

FIG. 8 is a flowchart showing details of the processing executed in the scheduling preparation stage (i.e., step S702) of FIG. 7. The processing of FIG. 8 includes setting of sheets (sheet types) required for the job and reading the timing for setting respective sheets (sheet types) based on the print job data received by the controller 1201.

In step S801, the controller 1201 obtains, based on the readout print job data, a list of sheets (sheet types) required to perform the print processing. More specifically, the controller 1201 analyzes the print job data received from a client and recognizes the sheets (sheet types) required for the processing of the print job data. The memory 1205 stores the sheet type(s) recognized by the controller 1201. Furthermore, the memory 1205 can store the information relating to the order of sheets (sheet types) to be successively used, in the process of recognizing the required sheets (sheet types) in step S801.

In step S802, the controller 1201 confirms the print order of sheets (sheet types) successively used based on the list of sheets (sheet types) required for the job, and sets the information relating to sheets (sheet types) to be initially set in the cassettes. The memory 1205 stores the information relating to the sheets (sheet types) to be initially set in step S802.

In step S803, considering the print order of the required sheets (sheet types), the controller 1201 sets the information relating to sheets (sheet types) to be finally set in the cassettes. More specifically, the information relating to the finally set sheets (sheet types) can be obtained by holding the print order of successively used sheets (sheet types) obtained in step S801. According to the example shown in FIG. 10, the controller 1201 can confirm based on the print job data received by the network printer 104 that the print order of successively used sheets is A→B→D→E→C→F→B→D→C→A→F→E. From this order, the controller 1201 can recognize that the sheets finally set in the cassettes are sheets A, F, and E. The memory 1205 stores the recognized information. Thus, the controller 1201 can execute the processing of step S803.

In step S804, the controller 1201 confirms the print order of required sheets (sheet types) and the finally used sheets (sheet types). The controller 1201 confirms the finally used timing for each of the sheets (sheet types) when the sheets (sheet types) are not the ones to be finally set in the cassettes. Then, the controller 1201 sets a final flag for each information relating to the sheets (sheet types) not being finally set. The memory 1205 stores information relating to the timing the controller 1201 has set the final flags for respective sheets (sheet types). For the purpose of explaining the final flag, the scheduling according to the first embodiment will be simply described below with reference to FIG. 11. Details of FIG. 11 will be described later.

In FIG. 11, the sheet C to be used in the fifth printing operation is encircled by a circle (○) 1102. Furthermore, the sheets B, D, and E (i.e., exchange objects at the timing the sheet C is set) are encircled by a large ellipse 1101. According to this example, final flags are assigned to sheet B 1103, sheet D 1104, and sheet C 1105 as indicated by arrows respectively. Namely, according to the example of FIG. 11, the finally used sheets (sheet types) are sheets A, F, and E. Thus, the remaining sheets B, D, and C are the objects to which the final flags are assigned. More specifically, the controller 1201 sets the final flag for the sheet B at timing 1103, for the sheet D at timing 1104, and for the sheet C at timing 1105. The memory 1205 stores the timing information set by the controller 1201.

The controller 1201 starts the scheduling (i.e., executes the above-described processing of step S703) based on the information set in steps S802, S803, and S804. More specifically, the controller 1201 can execute the scheduling processing with reference to the processing result of FIG. 8 stored in the memory 1205.

Figure 9:
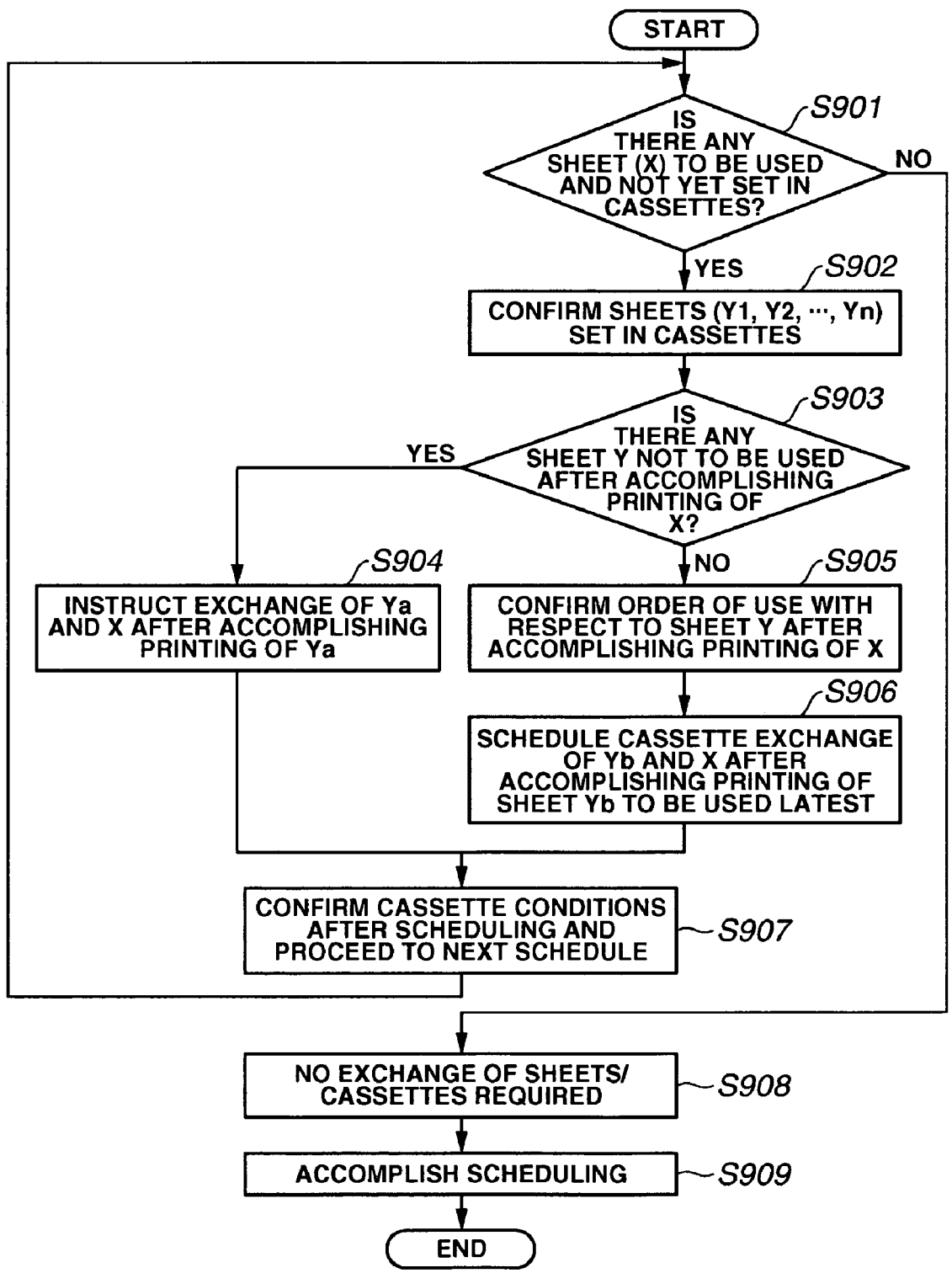
FIG. 9 is a flowchart showing a fundamental scheduling method in accordance with the embodiment of the present invention.

FIG. 9 is a flowchart showing details of the scheduling processing of step S703 shown in FIG. 7. In step S703, the controller 1201 performs the scheduling according to the scheduling method shown in FIG. 9 when the operator has selected the item 1502 "minimize total number of cassette exchange operations" shown in FIG. 15. The flowchart of FIG. 9 shows the processing capable of reducing the total number of sheet cassette exchange operations compared with the conventional system.

The controller 1201 starts the scheduling (i.e., starts the operation according to the flowchart of FIG. 9) in response to the reception of print job data. In step S901, the controller 1201 successively confirms the information relating to the required sheets (sheet types) and determines whether there is any sheet X not yet set in the cassettes (or whether the sheet cassette exchange scheduling has been completed). To this end, the controller 1201 can confirm the information relating to the sheets (sheet types) being set in the printer based on the information stored in the step S802.

Then, the controller 1201 can recognize the information relating to the required sheets (sheet types) based on the received print job data. Thus, the controller 1201 can execute the processing of step S901 based on the comparison between the sheets (sheet types) already set in the printer and the sheets (sheet types) required to process the print job data. Furthermore, the controller 1201 can access the memory 1205 to confirm the sheets (sheet types) whose print scheduling has not yet been completed.

When there is any sheet X not yet set in the cassettes (i.e., YES in step S901), the processing routine proceeds to step S902. Otherwise, the processing routine proceeds to step S908.

In step S902, the controller 1201 confirms the cassette conditions before the timing the sheet X is required. In other words, the controller 1201 confirms the conditions of the sheets (Y1, Y2, - - - , Yn) currently set in the cassettes. More specifically, the controller 1201 can execute the processing of step S902 by accessing the memory 1205, because the memory 1205 stores the information relating to the sheets (sheet types) already set in the printer (step S802) and manages the schedule of these sheets (sheet types).

In step S903, the controller 1201 determines whether there is any sheet Y not used after accomplishing the printing of sheet X (i.e., sheet Y accompanied with a final flag). More specifically, the controller 1201 accesses the memory 1205 to execute the judgment of S903 because the memory 1205 stores the information relating to the final flag (refer to the processing of step S804).

When there is any sheet Y accompanied with a final flag (i.e., YES in step S903), the processing routine proceeds to step S904. When there in no sheet Y accompanied with a final flag (i.e., NO in step S903), the processing routine proceeds to step S905.

In step S904, the controller 1201 sets a schedule for exchanging the sheet Ya and the sheet X (i.e., replacing the sheet Ya with the sheet X) after accomplishing the printing of the sheet Ya accompanied with a final flag. Then, the processing routine proceeds to step S907. The memory 1205 stores the information relating to the schedule set in step S904.

In step S905, the controller 1201 confirms the print order with respect to the sheets to be used after accomplishing the printing of the sheet X, because there is no sheet Y accompanied with a final flag. The memory 1205 stores the information relating to the confirmed order. More specifically, the controller 1201 manages the print order of sheets to be used in the print job at the timing the controller 1201 analyzes the received print job. Thus, the controller 1201 can confirm the print order of sheets to be used after accomplishing the printing of the sheet X.

In step S906, the controller 1201 designates a sheet Yb as an exchange object for the sheet X with reference to the order confirmed in step S905. The sheet Yb is a latest used sheet among the sheets Y. Then, the controller 1201 sets a schedule for exchanging the sheet Yb and the sheet X (i.e., replacing the sheet Yb with the sheet X) after accomplishing the printing of the sheet Yb. The memory 1205 stores the information relating to the schedule set in step S906. In step S907, the controller 1201 confirms (after scheduling) the conditions of the cassettes after accomplishing the printing of the sheet X as well as the print order with respect to the sheets to be used. Then, the processing routine returns to step S901.

After repeating the processing of steps S901 to S907, the controller 1201 proceeds to step S908 (after the judgment of NO in step S901) to decide that the sheet cassette exchange is no longer necessary.

In step S909, the controller 1201 summarizes the information relating to the scheduling and prepares UI information displayed on the operating section 1204 in the above-described step S703 before terminating the processing routine of FIG. 9.

FIG. 10 is a diagram showing the result of the scheduling set by the controller 1201 according to the processing routine shown in FIG. 9, for a print job similar to that shown in FIG. 6.

When the scheduling is set according to the processing method shown in FIG. 9, a total number of sheet cassette exchange operations can be reduced to 6 with respect to the print job shown in FIG. 10, whereas the conventional method shown in FIG. 6 requires a total of 9 sheet cassette exchange operations.

To describe the processing method shown in FIG. 9 in more detail, the scheduling will be thoroughly described below with reference to FIG. 11.

First, the controller 1201 analyzes the information relating to presently required sheets (sheet types) based on the received print job data and recognizes that the sheets A through F are sheets (sheet types) to be used. The memory 1205 stores the confirmed information. Furthermore, the memory 1205 stores the information relating to the print order with respect to the sheets (sheet types) to be used based on the print order. According to the example shown in FIG. 11, the print order is A→B→D→E→C→F→B→D→C→A→F→E.

Furthermore, the controller 1201 sets the sheets (sheet types) to be initially set with reference to the information relating to the print order with respect to the sheets (sheet types). According to the example of FIG. 11, the sheets to be initially set in the cassettes of the printer are sheets A, B, and D. The memory 1205 stores the information relating to the sheets (sheet types) to be initially set in the cassettes of the printer. Furthermore, the sheets (sheet types) finally set in the cassettes of the printer are sheets A, F, and E. The memory 1205 stores the information relating to the sheets (sheet types) to be finally set in the cassettes of the printer. The above processing corresponds to steps S801 to S803 of FIG. 8.

The controller 1201 recognizes the print order of sheets (sheet types) to be used and sets a final flag to predetermined sheets. According to the example of FIG. 11, the sheets (sheet types) finally set in the cassettes of the printer are sheets A, F, and E, as stored in the memory 1205. Thus, final flags are assigned to the sheet B indicated by an arrow 1103, the sheet D indicated by an arrow 1104, and the sheet C indicated by an arrow 1105. The memory 1205 stores the information relating to the final flags. The above processing corresponds to the processing of step S804 shown in FIG. 8.

Subsequently, the controller 1201 determines whether there is any sheet(s) to be used in the print job and not yet set in the printer. According to the example of FIG. 11, the sheets A, B, and D are initially set in the cassettes of the printer. The sheets C, E, and F are the sheets to be used in the print job and not yet set in the printer. Thus, the decision in step S901 becomes YES.

Next, the controller 1201 recognizes that the sheet E is an object to be initially exchanged among the sheets not yet set in the printer, based on the processing order of the sheets. In this case, the controller 1201 determines, with reference to the print order with respect to the sheets (sheet types) stored in the memory 1205, whether the sheets A, B, and D presently set in the printer are used again after accomplishing the printing of the sheet E (corresponding to step S903).

The controller 1201 can access the memory 1205 to recognize the processing order of sheets, and accordingly can confirm that the usage of the sheets A, B, and D is necessary after accomplishing the printing of the sheet E. Accordingly, the decision in step S903 becomes NO. Then, in step S905, the controller 1201 recognizes the print order with respect to the sheets to be used after accomplishing the printing of the sheet E. The memory 1205 stores the recognized order of use. In this case, the controller 1201 can confirm that the sheet A is an object to be finally exchanged among the sheet A, B, and D after accomplishing the printing of the sheet A. Thus, after accomplishing the printing of the sheet A, the memory 1205 stores schedule information 1106 that indicates exchange of the sheet A and the sheet E.

Next, it is now assumed that in FIG. 11 the sheet C to be used in the fifth printing operation and not yet set in the sheet cassettes is determined to be necessary 0(corresponding to step S901 in FIG. 9). In the conditions immediately before the use of sheet C, the sheets B, D, and E are set in the cassettes (corresponding to step S902). At this moment, no final flags are assigned to the sheets B, D, and E (corresponding to the step S903). Thus, the controller 1201 can confirm that the sheets B, D, and E are planned to be used after accomplishing the printing of the sheet A. Then, the controller 1201 recognizes the print order as sheet B→sheet D→sheet E (step S905).

In this case, the controller 1201 designates the sheet E, which is planned to be used the latest, as an exchange object of the sheet C. The memory 1205 stores information 1107 relating to the scheduling for exchanging the sheet E and the sheet C (i.e., replacing the sheet E with the sheet C) after accomplishing the printing of the sheet E (step S906). The controller 1201 repeats the above-described processing until the sheet exchange schedule can be finally accomplished, and obtains the exchange schedule information shown in FIG. 11.

As described above, the processing shown in FIG. 9 can provide an optimized scheduling for the cassette exchange operations even in a case where the received job data instructs the use of plural sheets (sheet types) exceeding the number of sheets (sheet types) simultaneously settable in the printer. Thus, the controller 1201 can realize user's intended print processing capable of minimizing the total number of sheet cassette exchange operations. Furthermore, the above-described processing for minimizing the total number of cassette exchange operations requires no change in the processing order being set in the print job and accordingly user's operability can be maintained adequately.

Figure 12:
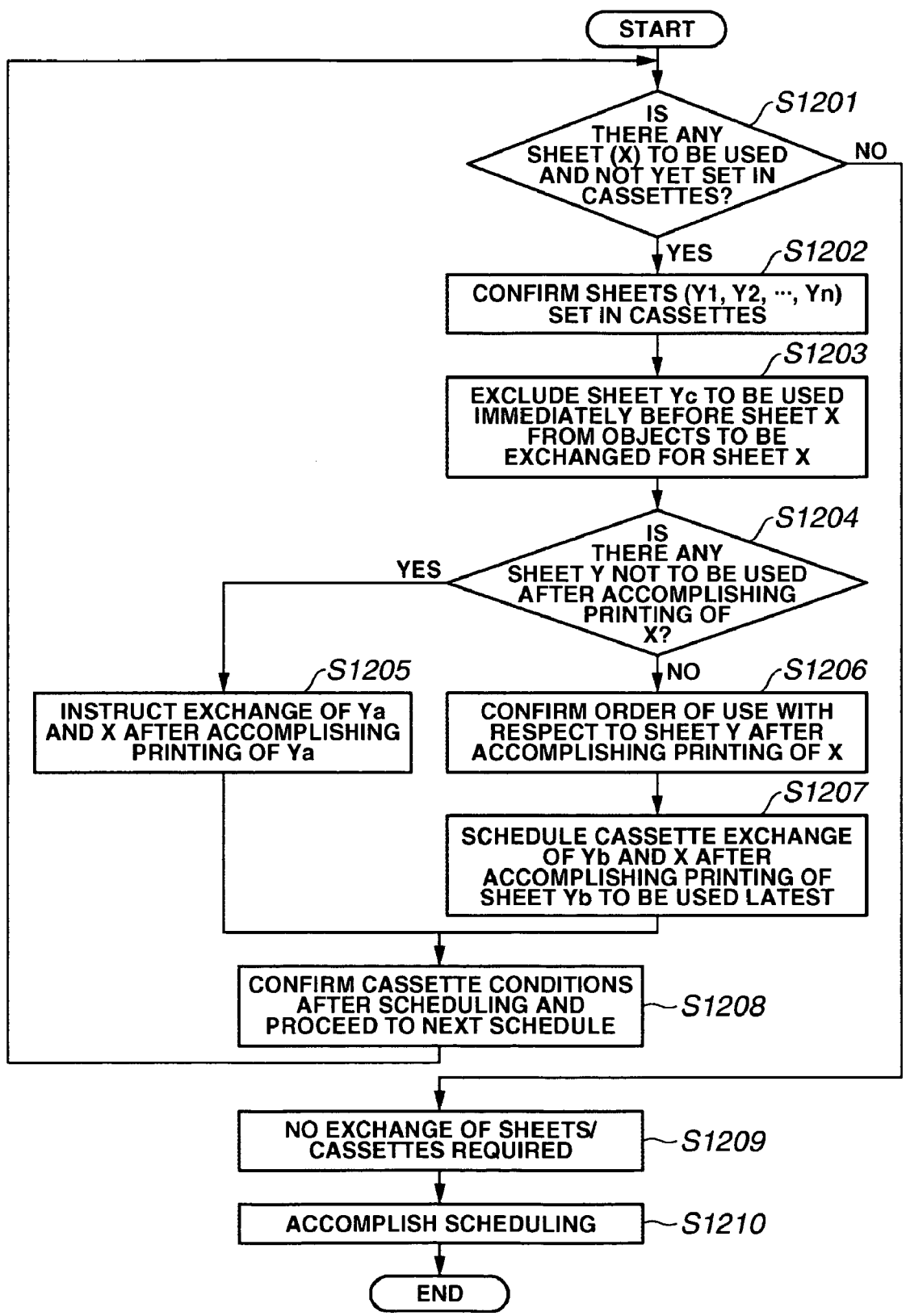
FIG. 12 is a flowchart showing a scheduling method capable of prohibiting immediate exchange of sheet cassettes in accordance with the embodiment of the present invention.

FIG. 12 is a flowchart showing details of the processing performed in step S703 of FIG. 7. When the operator has selected the item 1503 "prohibit sheet cassettes from being exchanged immediately before use" on the UI shown in FIG. 15, the controller 1201 executes the scheduling according to the scheduling method shown in FIG. 12 in step S703. The flowchart of FIG. 12 shows the processing capable of reducing the total number of sheet cassette exchange operations compared with the conventional system. Furthermore, the flowchart of FIG. 12 shows a scheduling method capable of prohibiting the exchange of sheet cassettes at the timing immediately before the exchanged (i.e., replaced) sheet cassette is used.

According to the scheduling result (FIG. 10), the total number of sheet cassette exchange operations can be reduced. However, this scheduling includes an immediate exchange of next required sheets (sheet types), such as E→C 1002 and C→F 1003. Accordingly, if the sheet exchange preparation is not sufficiently done, the print processing may be interrupted and the print processing will be delayed. In view of the above, the scheduling method shown in FIG. 12 enables eliminating any immediate exchange of next required sheets (sheet types).

The controller 1201 starts the scheduling (i.e., starts the operation according to the flowchart of FIG. 12) in response to reception of print job data.

In step S1201, the controller 1201 successively confirms the information relating to the required sheets (sheet types) and determines whether there is any sheet X not yet set in the cassettes (or whether the sheet cassette exchange scheduling has been completed). The processing of step S1201 is substantially identical with the processing of the above-described step S801 and accordingly will not be explained in detail.

When there is any sheet X to be used and not yet set in the cassettes (i.e., YES in step S1201), the processing routine proceeds to step S1202. Otherwise, the processing routine proceeds to step S1209.

In step S1202, the controller 1201 confirms the cassette conditions before the timing the sheet X is required. In other words, the controller 1201 confirms the conditions of the sheets (Y1, Y2, - - - , Yn) currently set in the cassettes. The processing of the step S1202 is substantially identical with the processing of the above-described step S802 and will not be described in detail.

In step S1203, the controller 1201 excludes a sheet Yc from the exchange objects for the sheet X, because the sheet Yc is positioned immediately before the sheet X, with reference to the sheets confirmed in step S1202. Then, the controller 1201 sets the information relating to the excluded sheet Yc. More specifically, a non-exchange object flag is assigned to the sheet Yc to exclude the sheet Yc from the exchange object in the processing of a later-described step S1205 or step S1207. The memory 1205 stores the information relating to the non-exchange object.

In step S1204, the controller 1201 determines whether there is any sheet Y not used after accomplishing the printing of sheet X (i.e., sheet Y accompanied with a final flag). The processing of step S1204 is substantially identical with the processing of the above-described step S803 and accordingly will not be explained in detail. When there is any sheet Y accompanied with a final flag (i.e., YES in step S1204), the processing routine proceeds to step S1205. When there in no sheet Y accompanied with a final flag (i.e., NO in step S1204), the processing routine proceeds to step S1206.

In step S1205, the controller 1201 sets a schedule for exchanging the sheet Ya and the sheet X (i.e., replacing the sheet Ya with the sheet X) after accomplishing the printing of the sheet Ya accompanied with a final flag. Then, the processing routine proceeds to step S1208. The memory 1205 stores the information relating to the schedule set in step S1205. Furthermore, in this step, the controller 1201 excludes the sheet accompanied with the non-exchange object flag set in step S1203.

In step S1206, the controller 1201 confirms the print order with respect to the sheets to be used after accomplishing the printing of the sheet X, because there is no sheet Y accompanied with a final flag. The memory 1205 stores the information relating to the confirmed order.

In step S1207, the controller 1201 designates a sheet Yb as an exchange object for the sheet X with reference to the order confirmed in step S1206. The sheet Yb is a sheet used the latest among the sheets Y. Then, the controller 1201 sets a schedule for exchanging the sheet Yb and the sheet X (i.e., replacing the sheet Yb with the sheet X) after accomplishing the printing of the sheet Yb. The memory 1205 stores the information relating to the schedule set in step S906. Furthermore, the controller 1201 excludes the sheet accompanied with the non-exchange object flag set in step S1203 from the scheduling object in this step.

In step S1208, the controller 1201 confirms (after scheduling) the conditions of the cassettes after accomplishing the printing of the sheet X as well as the print order with respect to the sheets to be used. Then, the processing routine returns to step S1201.

After repeating the processing of steps S1201 to S1208, the controller 1201 proceeds to step S1209 (after the judgment of NO in S1201) to decide that the sheet cassette exchange is no longer necessary. Then, the processing routine proceeds to step S1210.

In step S1210, the controller 1201 summarizes the information relating to the scheduling and prepares UI information displayed on the operating section 1204 in the above-described step S703 before terminating the processing routine of FIG. 12.

The above-described scheduling method can prohibit immediate exchange of required sheets and accordingly can eliminate the delay of a print job that may be caused due to operator's errors in the cassette exchange work. The print job can be accomplished as expected without causing interruption of the print processing.

FIG. 13 is a diagram showing the result of the scheduling set by the controller 1201 according to the processing routine shown in FIG. 12, for a print job similar to that shown in FIG. 6. According to the scheduling method shown in FIG. 12, the exchange of the sheet cassettes must be successively performed after accomplishing the printing of the sheets A, D, E, F, B, D, and C as shown in FIG. 13. A total number of sheet cassette exchange operations can be reduced to 7, whereas the conventional method shown in FIG. 6 requires a total of 9 sheet cassette exchange operations. Furthermore, the sheet cassette exchange schedule shown in FIG. 13 can prohibit immediate exchange of required sheets (sheet types).

Figure 14:
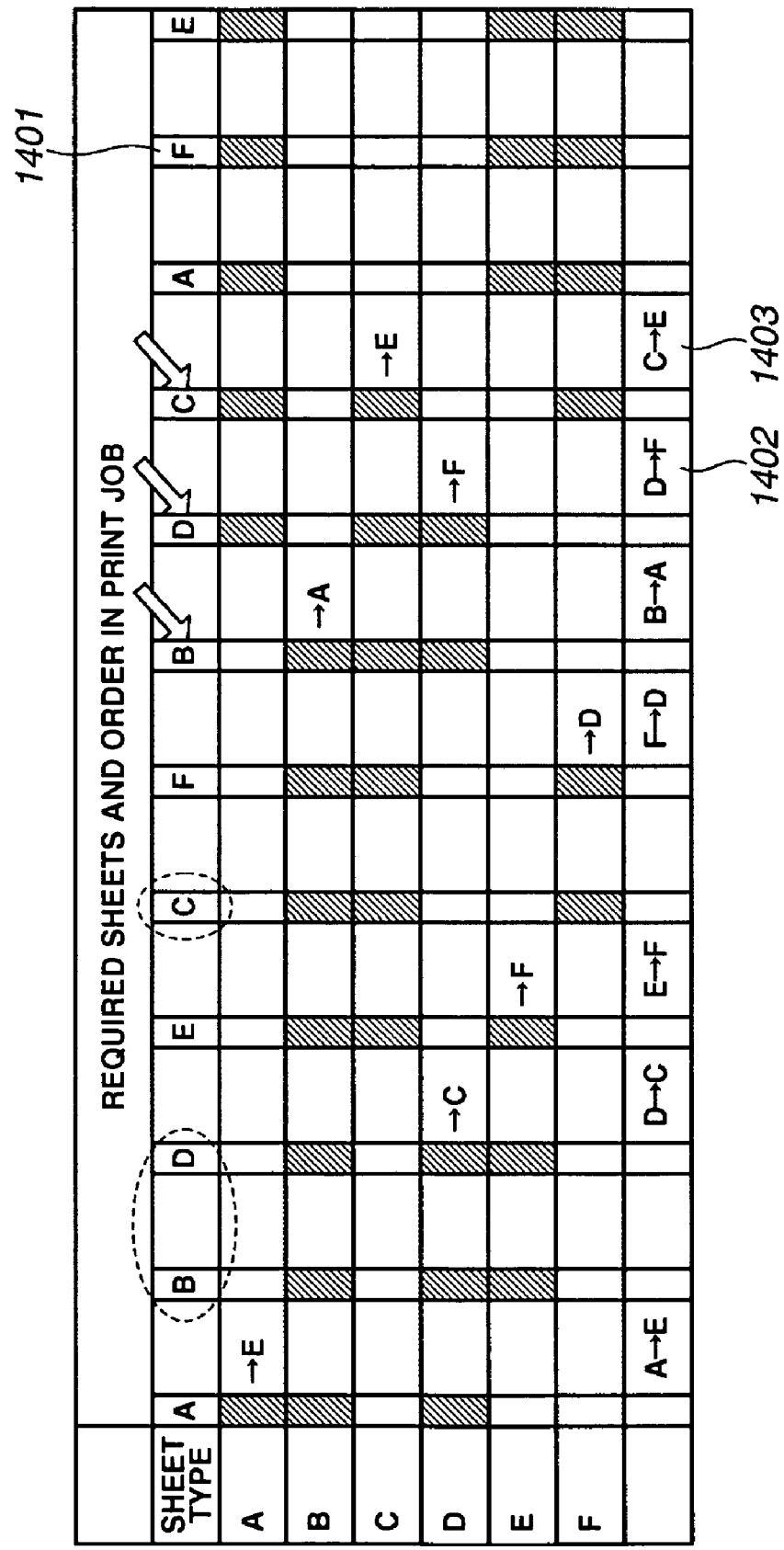
FIG. 14 is a diagram showing details of the sheet cassette exchanging schedule in accordance with the embodiment of the present invention.

FIG. 14 is a diagram showing details of the scheduling shown in FIG. 13. In FIG. 14, the sheet C to be used in the fifth printing operation is encircled by a circle (○). The sheets B and D (i.e., exchange objects for the sheet C) are encircled by a large ellipse. Final flags are assigned to the sheets B, D, and C as indicated by arrows respectively. The scheduling method shown in the flowchart of FIG. 12 will be successively described with reference to FIG. 14.

It is not assumed that in FIG. 14 the sheet C to be used in the fifth printing operation and not yet set in the sheet cassettes is determined to be necessary (corresponding to the step S1201 in FIG. 12). In the conditions immediately before the use of sheet C, the sheets B, D, and E are set in the cassettes (corresponding to the step S1202). At this moment, the controller 1201 can confirm that the sheet planned to be used immediately before the sheet C is the sheet E used in the fourth printing operation. Thus, the controller 1201 excludes the sheet E from the exchange objects for the sheet C. As a result, the sheets B and D remain as exchangeable sheets set in the cassettes (step S1203).

At this moment, no final flags are assigned to the sheets B and D (corresponding to the step S1204). Thus, the controller 1201 can confirm that the sheets B and D are planned to be used after accomplishing the printing of the sheet C. Then, the controller 1201 recognizes the print order as sheet B→sheet D based on the print order of sheets to be used in the present object stored in the memory 1205 (step S1206).

In this case, the controller 1201 designates the sheet D, which is planned to be used later, as an exchange object of the sheet C. The controller 1201 sets a schedule for exchanging the sheet D and the sheet C (i.e., replacing the sheet D with the sheet C) after accomplishing the printing of the sheet D (step S1207). For the next required sheet (i.e., returning from step S1208 to step S1201), the controller 1201 repeats the above-described processing until the sheet exchange schedule can be finally accomplished, and obtains the exchange schedule information shown in FIG. 14.

Second Embodiment (System Arrangement)

The second embodiment is substantially identical in system arrangement with the above-described first embodiment, and accordingly only the different portions will be described below.

(Operation of the System)

The system of the second embodiment operates in the following manner.

The first embodiment has described the scheduling method capable of reducing the total number of sheet cassette exchange operations compared with the conventional system. The basic constitution of the second embodiment is based on the first embodiment. The second embodiment provides a method capable of simultaneously exchanging plural cassettes in addition to the above-described method of the first embodiment.

Figures 17A, 17B:
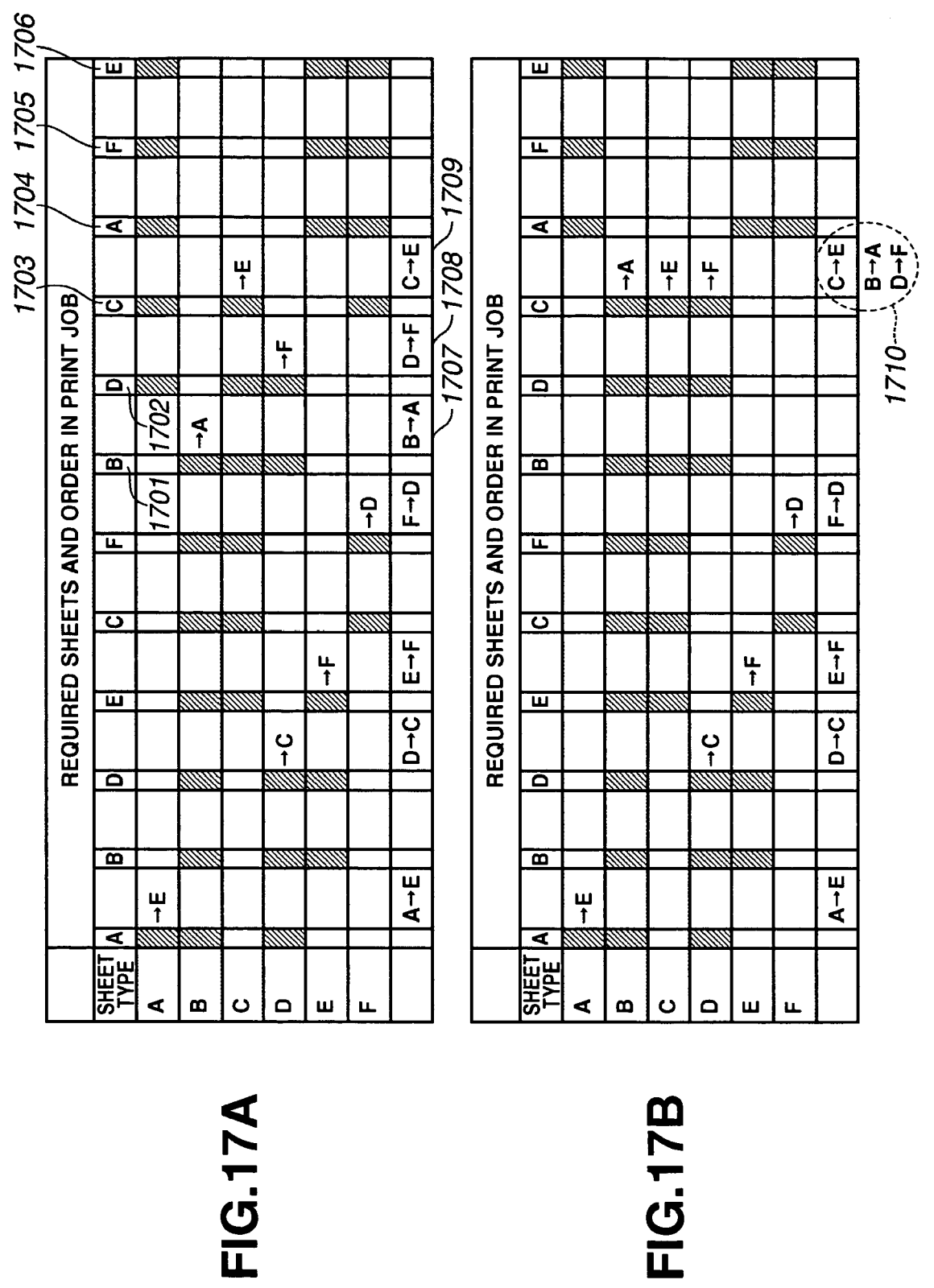

FIGS. 17A and 17B are diagrams showing the result of scheduling set by the controller 1201 according to the second embodiment, for a print job similar to that shown in FIG. 6, to describe the capability of adjusting the timing of sheet cassette exchange.

In the second embodiment, the controller 1201 determines whether the timing of scheduled sheet cassette exchange operations can be adjusted, based on the scheduling for minimizing the total number of sheet cassette exchange operations as described in the first embodiment. In this respect, the second embodiment can realize simultaneous exchange of plural sheet cassettes to further optimize the cassette exchange processing.

FIG. 17A is a diagram showing the condition of scheduling prior to adjustment of the sheet cassette exchange timing (similar to FIG. 14).

The scheduling shown in FIG. 17A includes sheet cassette exchange operation B→A 1707 performed after accomplishing the printing of the sheet B 1701, sheet cassette exchange operation D→F 1708 performed after accomplishing the printing of the sheet D 1702, and sheet cassette exchange operation C→E 1709 performed after accomplishing the printing of the sheet C 1703. However, the actual print timing 1704 of the sheet A is sufficiently later than the sheet cassette exchange operation B→A 1707. In other words, the sheet cassette exchange operation B→A 1707 can be postponed until the timing immediately before starting the printing of the sheet A 1704. Similarly, the actual print timing 1705 of the sheet F is sufficiently later than the sheet cassette exchange operation D→F 1708.

The sheet cassette exchange operation D→F 1708 can be postponed until the timing immediately before starting the printing of the sheet F 1705. Accordingly, the scheduling shown in FIG. 17B proposes a single sheet cassette exchange operation for simultaneously exchanging plural sheets at the same timing 1710, instead of using the scheduling of FIG. 17A that includes three sheet cassettes exchange operations 1707, 1708, and 1709.

First, the controller 1201 confirms the scheduling of FIG. 17A and checks the timing the printing of the exchanged sheet actually starts. In the case of sheet cassette exchange operation B→A 1707, the printing of the sheet A does not start before accomplishing the print of the sheets D and C.

In this manner, when any other exchange processing is planned before actually starting the printing of an exchanged sheet, plural sheet cassettes can be exchanged at a time.

The printing system according to the second embodiment can operate in the same manner as that of the first embodiment. Thus, the operation of the printing system according to the second embodiment (chiefly about different portions) will be described with reference to the flowchart of FIG. 7.

The processing of FIG. 7 starts when the network printer 104 receives the data of one print job. In step S710, the controller 1201 displays an exchange condition setting UI (shown in FIG. 18) on the operating section 1204 and waits for instruction or data entered by an operator.

Figure 18:
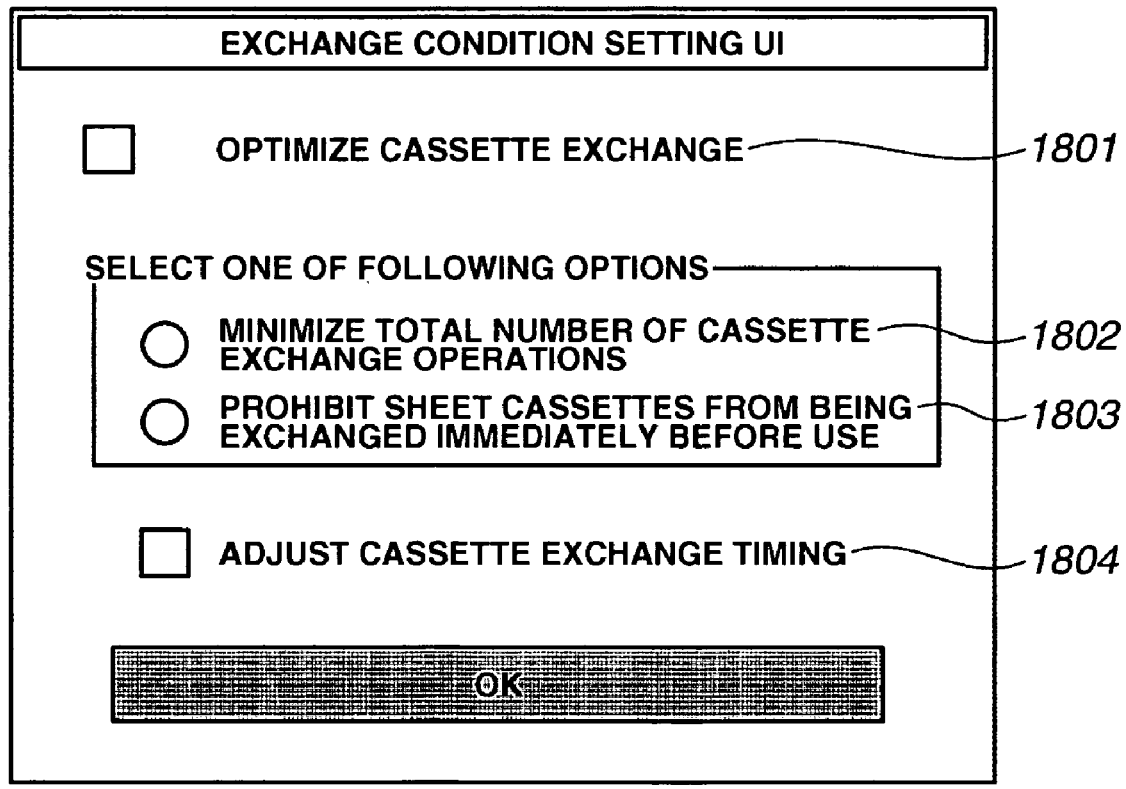
FIG. 18 is an exemplary diagram showing a sheet cassette exchange condition setting UI in accordance with the embodiment of the present invention.

The sheet cassette exchange condition setting UI shown in FIG. 18 is similar to that of the first embodiment but includes, as a new setting item, an item 1804 "adjust cassette exchange timing". The operator can select the item 1804 after the operator has selected the item 1801. When the operator has selected the item 1804 "adjust cassette exchange timing", the controller 1201 instructs the scheduling enabling the simultaneous sheet cassette exchange operation as described with reference to FIGS. 17A and 17B. The memory 1205 stores the contents set by the operator through the UI shown in FIG. 18.

Although the second embodiment will be described below with reference to the flowchart of FIG. 7, the fundamental flow is substantially the same as that of the first embodiment and accordingly different portions (steps) will be described in detail. When the controller 1201 detects the operator's depressing the OK button through the UI shown in FIG. 18 (in step S710), the processing routine proceeds to step S720.

When the operator has selected the item 1802 or the item 1803 on the UI of FIG. 18 (i.e., YES in step S720), the processing routine proceeds to step S702. When the operator has selected none of the item 1802 and the item 1803 (i.e., NO in step S720), the processing routine proceeds to step S705.

In step S702, the controller 1201 reads the setting of the received print job data and reads the information relating to the required sheets (sheet types). The processing of step S702 is substantially identical with the processing of the first embodiment described in detail with reference to the flowchart of FIG. 8.

The controller 1201 confirms the information relating to the required sheets (sheet types) and starts the scheduling for the sheet cassette exchange (step S703). In this case, the controller 1201 performs the scheduling according to a first scheduling method (later described) when the item 1802 "minimize total number of cassette exchange operations" is selected on the UI shown in FIG. 18.

The controller 1201 performs the scheduling according to a second scheduling method (described below) when the item 1803 "prohibit sheet cassettes from being exchanged immediately before use" is selected on the UI shown in FIG. 18. Furthermore, when the item 1804 "adjust cassette exchange timing" is selected on the UI shown in FIG. 18, the controller 1201 performs the scheduling for adjusting the cassette exchange timing to simultaneously exchange plural cassettes before performing the above-described first and second scheduling methods.

In step S704, the controller 1201 confirms accomplishment of the scheduling and brings the system into a stand-by condition for the print processing. More specifically, the controller 1201 reads the information relating to the scheduling performed and controls the operating section 1204 to display a sheet cassette exchange instructing UI (refer to FIG. 19).

In step S705, the controller 1201 starts the print processing. In this case, the print processing starts according to the schedule if the schedule is set according to the scheduling performed in step S703. The controller 1201, when the operating section 1204 displays the sheet cassette exchange instructing UI, successively renews the UI according to the print situation (i.e., the progress of the schedule being set) to encourage the operator to exchange the sheet cassettes.

Figure 19:
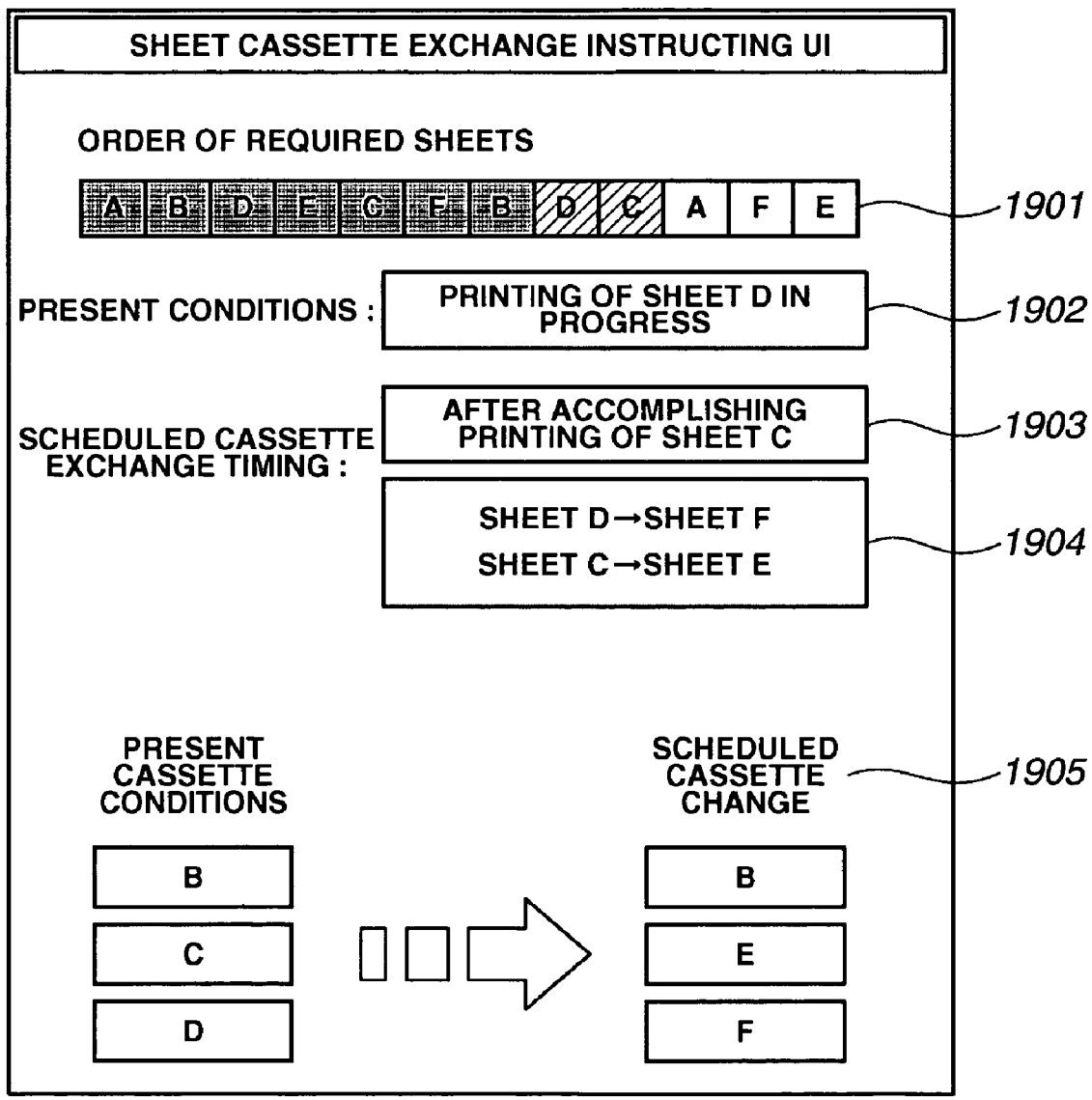
FIG. 19 is an exemplary diagram showing a sheet cassette exchange instructing UI in accordance with the embodiment of the present invention.

FIG. 19 is an exemplary diagram showing a sheet cassette exchange instructing UI displayed by the system in the processing according to the second embodiment. The UI of FIG. 19 includes an item 1901 displaying the print order of sheets (sheet types) required in the print job. More specifically, to let the operator easily confirm the progress of the job, a dark colored frame represents the sheet (sheet type) whose print processing has been already finished, a shaded frame represents the sheet (sheet type) whose print processing is currently in progress, and a light colored frame represents the sheet (sheet type) whose print processing is not yet started.

In FIG. 19, an item 1902 displays details of the present conditions. An item 1903 notifies the timing of the next sheet cassette exchange operation. An item 1904 displays the information relating to the objects (i.e., sheet types) to be exchanged. When the item 1804 "adjust cassette exchange timing" is selected on the UI shown in FIG. 18, the item 1904 of FIG. 19 displays plural sets of objects (i.e., sheet types) to be exchanged simultaneously. According to the example of FIG. 19, the sheet cassette exchange operations D→F and C→E are simultaneously performed after accomplishing the printing of the sheet C. An item 1905 provides a graphical display showing the cassette exchange conditions. The graphical display of the item 1905 enables the operator to easily know the changes before and after the simultaneous sheet cassette exchange operation.

In the second embodiment, the controller 1201 confirms accomplishment of the print job and terminates the processing routine of FIG. 7.

The processing routine of FIG. 8, i.e., details of the scheduling preparation performed in step S702 shown in FIG. 7, can be applied to the second embodiment.

Figure 20:
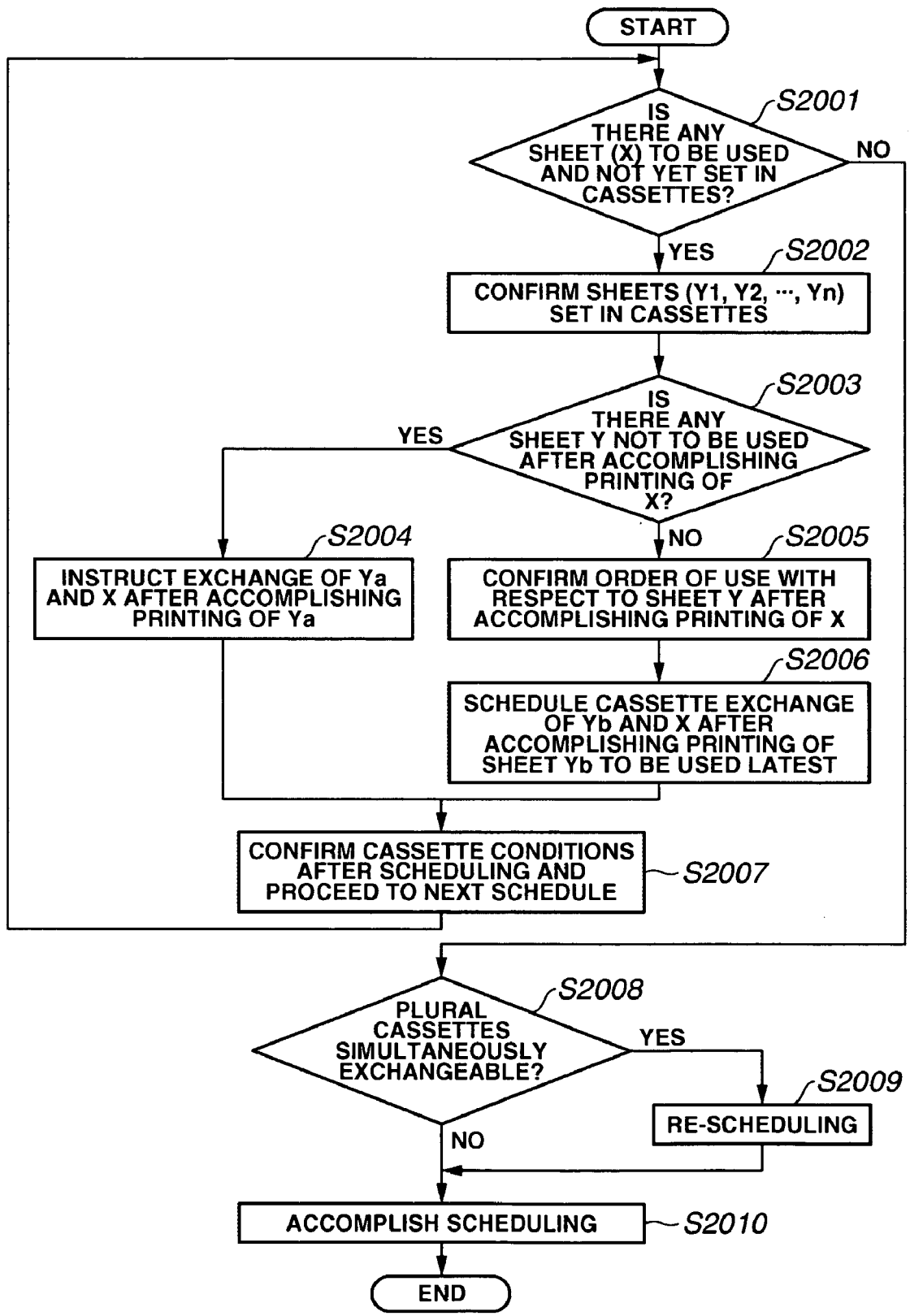
FIG. 20 is a flowchart showing a first scheduling method performed in response to selection of an item "minimize total number of cassette exchange operations" in accordance with the embodiment of the present invention.

FIG. 20 is a flowchart showing details of the scheduling processing (step S703) according to the second embodiment. The fundamental processing flow shown in FIG. 20 is substantially identical with that of FIG. 9. Different portions will be chiefly described. When the item 1802 "minimize total number of cassette exchange operations" is selected on the UI shown in FIG. 18, the controller 1201 executes the scheduling according to the first scheduling method shown in FIG. 20.

The first scheduling method of the second embodiment is based on the scheduling method of the first embodiment described with reference to the flowchart of FIG. 9, and accordingly can reduce the total number of sheet cassette exchange operations compared with the conventional system. The processing of steps S2001 through S2007 shown in FIG. 20 is identical with the processing of steps S901 through S907 shown in FIG. 9. When the decision in step S2001 is negative (i.e., NO in step S2001), the processing routine proceeds to step S2008.

In step S2008, the controller 1201 determines whether plural cassettes can be simultaneously exchangeable. More specifically, the memory 1205 stores the information relating to the timing of the sheet exchange operations through the processing of steps S2001 through S2007. The controller 1201 recognizes the information relating to the exchange of respective sheets, and executes the processing of step S2008 depending on the presence of other exchange information prior to the printing of the sheet to be newly set in the cassettes. Details of the processing performed in step S2008 will be described below with reference to FIG. 10. The memory 1205 stores information relating to the scheduling shown in FIG. 10.

The controller 1201 recognizes initial exchange information 1001 instructing exchange of sheet A and sheet E (i.e., replacing the sheet A with the sheet E) at the timing of exchange information 1001. At this moment, the controller 1201 analyzes the print timing of the newly set sheet E. As a result, the controller 1201 recognizes that the sheet E is required in the fourth printing operation. The controller 1201 determines whether there is any exchange information other than the exchange information 1001 prior to the printing of the sheet E. According to the example shown in FIG. 10, there is no exchange information other than the exchange information 1001 prior to the printing of the sheet E. Therefore, the controller 1201 concludes that simultaneous exchange of plural cassettes cannot be performed.

By successively repeating the above processing, the controller 1201 can recognize exchange information 1004 instructing exchange of sheet B and sheet C. The controller 1201 analyzes the print timing of a newly used sheet C. As a result, the controller 1201 recognizes that the sheet C is required in the ninth printing operation. The controller 1201 determines whether there is any exchange information other than the exchange information 1004 prior to the printing of the sheet C.

In this case, the controller 1201 can recognize the presence of exchange information 1005. The controller 1201 decides that the exchange information 1004 can be executed simultaneously at the timing of the exchange information 1005. Thus, the controller 1201 executes re-scheduling processing of step S2009. The memory 1205 stores the re-scheduled information.

After the above-described processing of steps S2001 to S2009, the controller 1201 accomplishes the scheduling in step S2010. The processing of step S2010 is substantially identical with the processing of step S909 shown in FIG. 9.

When the item 1803 "prohibit sheet cassettes from being exchanged immediately before use" is selected on the UI shown in FIG. 18, the controller 1201 executes the scheduling according to the second scheduling method shown in FIG. 21.

The second scheduling method of the second embodiment is based on the scheduling method of the first embodiment described with reference to the flowchart of FIG. 12, and accordingly can reduce the total number of sheet cassette exchange operations and also can prohibit the immediate exchange of sheet cassettes compared with the conventional system.

The processing of steps S2101 through S2108 shown in FIG. 21 is identical with the processing of steps S1201 through S1208 shown in FIG. 12. Furthermore, the processing of steps S2109 through S2111 is identical with the processing of steps S2008 through S2010 shown in FIG. 20.

According to the second embodiment, the sheet exchange timing can be adjusted so that plural sheets cassettes can be simultaneously exchanged. The sheet exchange processing can be further optimized. User's operability can be improved.

Although the above-described embodiments have been explained based on the print job instructing the use of plural sheets (sheet types), the present invention is not limited to the above-described embodiments. For example, even if a job requires sheets of only one type, the requested sheets may not be set in the printer. Even in such a case, using the above-described method of the present invention can optimize the cassette exchange operation(s), although the job order must be scheduled beforehand.

Third Embodiment

The first and second embodiments disclose the network printer (i.e., an image forming apparatus) performing the above-described processing. However, the information processing apparatus can be functionally equivalent to the network printer. The third embodiment provides an information processing apparatus capable of realizing the above-described functions of the present invention.

The information processing apparatus according to the third embodiment can produce print job data processibly by an image forming apparatus, and includes an information acquiring unit, a judging unit, a decision unit, and a display unit.

The information acquiring unit obtains, based on the print job data, information relating to a sheet type required in the print processing and a print order of the required sheet type. More specifically, CPU 200 shown in FIG. 2 can obtain the required sheet type and the print order of the required sheet type and RAM 202 shown in FIG. 2 can store the obtained data.

The judging unit determines whether the required sheet type obtained by the information acquiring unit is initially set in the image forming apparatus. More specifically, the CPU 200 can communicate via a network with a printer to obtain the information relating to the sheet type set in the printer. Thus, the CPU 200 can determine whether the required sheet type is initially set in the image forming apparatus.

The decision unit decides, based on the print order of the required sheet type obtained by the information acquiring unit, exchange object information relating to a sheet type later used but not initially set in the image forming apparatus, when the judging unit determines that the required sheet type is not initially set in the image forming apparatus.

More specifically, when the required sheet type is not initially set in the image forming apparatus, the CPU 200 decides the exchange object information (e.g., sheet type or cassette ID) based on the print order of the required sheet types stored in the RAM 202.

In addition, the display unit displays information relating to exchange processing for the sheet type later used but not initially set in the image forming apparatus, based on the exchange object information decided by the decision unit. More specifically, the display 207 shown in FIG. 2 can display the exchange object information decided by the CPU 202.

The CPU 202 of the information processing apparatus according to the third embodiment can control the display 207 to display the timing for exchanging the sheet type later used but not initially set in the image forming apparatus with the sheet type initially set in the image forming apparatus.

The information processing apparatus according to the third embodiment further includes a final information setting unit, a first information acquiring unit, and a second judging unit.

The final information setting unit sets information relating to a sheet type finally set in the image forming apparatus, based on the print order of the required sheet type obtained by the information acquiring unit, when the judging unit determines that the required sheet type is not initially set in the image forming apparatus. More specifically, the CPU 200 can set the final information based on the print order of the required sheet types stored in the RAM 202.

The first information acquiring unit obtains first information relating to a sheet type to be printed before starting printing of the sheet type later used but not initially set in the image forming apparatus. More specifically, the CPU 200 can obtain the first information based on the print order of the required sheet types stored in the RAM 202.

The second judging unit determine, based on the first information obtained by the first information acquiring unit, whether there is second information relating to a sheet type which is not the sheet type corresponding to the information set by the final information setting unit and is no longer used after accomplishing the printing of the sheet type not initially set in the image forming apparatus. More specifically, the CPU 200 can determine the presence of the second information based on the print order of the required sheet types stored in the RAM 202.

The display unit displays, when the second information is detected by the second judging unit, information relating to exchange of the sheet type corresponding to the second information and the sheet type not initially set in the image forming apparatus after accomplishing the printing of the sheet corresponding to the second information. More specifically, the CPU 200 can control the display 207 to display the information.

The CPU 200 of the information processing apparatus according to the third embodiment can control the display 207 to display, when the second information is not detected by the second judging unit, a sheet type printed latest after accomplishing printing of the sheet type not initially set in the image forming apparatus as the exchange object exchanged with the sheet type not initially set in the image forming apparatus, among sheet types corresponding to the first information obtained by the first information acquiring unit, after accomplishing printing of the sheet type printed latest before starting the printing of the sheet type not initially set in the image forming apparatus.

The CPU 200 of the information processing apparatus according to the third embodiment can obtain, based on the print order of the required sheet type obtained by the information acquiring unit (stored in the RAM 202), information relating to sheet types printed before starting printing of the sheet type not initially set in the image forming apparatus, and can exclude information relating to a sheet type printed immediately before starting printing of the sheet type not initially set in the image forming apparatus. Then, the CPU 200 can control the display 207 to display sheet exchange information.

The CPU 200 of the information processing apparatus according to the third embodiment can control the display 207 to display, at predetermined timing, information relating to exchange of a plurality of sheet types not initially set in the image forming apparatus.

The CPU 200 of the information processing apparatus according to the third embodiment can transmit the print job data including the use of a plurality of sheet types.

The exchange object information relating to the sheet type later used but not initially set in the image forming apparatus, displayed on the display 207, is the information relating to a cassette for storing the sheet type initially set in the image forming apparatus or the sheet type later used but not initially set in the image forming apparatus.

The present embodiment enables an operator (a worker) to easily know the effective way of exchanging the sheets (sheet types) while the operator works on the information processing apparatus. Thus, the user's operability can be improved. For example, a received job may include the use of plural sheets (sheet types), and the job processing order or the processed page order cannot be changed.

In such cases, in the print processing or prior to the exchange of sheets (sheet types), the controller selects "a paper feeding section of the sheet (sheet type) not planned to use" among the sheets (sheet types) required in the job after accomplishing the printing of a specific sheet (sheet type) not initially set in the image forming apparatus, or selects "a paper feeding section of the sheet (sheet type) planned to use latest" after accomplishing the printing of the specific sheet (sheet type). The display section can notify the operator of a sheet cassette exchange request for the selected paper feeding section.

According to the present invention, the controller can check the exchange timing (order) of the sheet cassettes required in a print job and can schedule optimum cassette exchange operations. Thus, the operator can effectively perform the sheet cassette exchange operations. Furthermore, the operator can confirm the sheet cassette exchange timing on the UI (user interface). Thus, the operator can smoothly perform the sheet cassette exchange operations.

Other Embodiments

The above-described embodiments can be modified in the following manner.

(1) According to the above-described embodiments, the flow and GUI controls are fundamentally performed as the operation of the printing system. However, the above-described flow and GUI controls can be done by a client apparatus according to a print control program. For example, instead of using the operating section 1204, the display 207 can display the UIs shown in FIGS. 15, 16, 18, and 19. The network printer control program 403 shown in FIG. 4 can be the print control program for realizing the above-described embodiments. The network printer control program 403 can be created based on the flowcharts of the above-described embodiments. In FIG. 5, the FD 204 can store the network printer control program and related data.

In this case, the processing procedures shown in FIGS. 7-9 and 12 can be executed by the CPU 200 shown in FIG. 2. The CPU 200 can read the print control program from the RAM 202 and execute the program. The RAM 202 can store various data relating to the print processing. Furthermore, the client can start the processing of FIG. 7 when the client created the data of a print job, although in the above-described embodiments the network printer 104 starts the processing of FIG. 7 in response to the reception of print job data. Furthermore, as described above, the network printer can monitor its own conditions and can notify the client of completion of the print job or printer conditions. Thus, the client can easily know the print conditions and cassette conditions of the network printer.

(2) The present invention is not limited to the above-described embodiments disclosing the printing system including a network printer, and therefore can be applied to any other printing system having an image forming function, such as a multi function peripheral that include various functions (e.g., copy function, image scanner function, image transmission function, image receiving function, printer function, box reserving function, etc.)

(3) Furthermore, the controller can start the scheduling together with the printing, although in the above-described embodiments the processing of FIG. 7 separately executes the scheduling and the printing.

As described above, the present embodiment provides, as a first mode, a printing system including an information processing apparatus capable of producing print job data including information of plural sheets and an image forming apparatus capable of performing a print job based on the print job data transmitted from the information processing apparatus.

The image forming apparatus includes an order information acquiring unit, a final information setting unit, a first information acquiring unit, a judging unit, a first schedule setting unit, a second schedule setting unit, a schedule producing unit, and an instructing unit (refer to the first and second embodiments).

The order information acquiring unit (refer to steps S801 and S802) obtains information relating to print order of sheet types, based on the print job data. The final information setting unit (refer to step S803) sets information relating to a sheet type finally set in the image forming apparatus, based on the print order of the required sheet type obtained by the order information acquiring unit.

The first information acquiring unit (refer to steps S902 and S1202) obtains, based on the print order of the required sheet type obtained by the order information acquiring unit, first information relating to a sheet type (Y1, Y2, - - - , Yn) to be printed before starting printing of a specific sheet type later used but not initially set in the image forming apparatus.

The judging unit (refer to steps S903 and S1204) determines, based on the first information obtained by the first information acquiring unit, whether there is second information relating to a sheet type (sheet Y accompanied with a final flag) which is not the sheet type corresponding to the information set by the final information setting unit and is no longer used after accomplishing the printing of the sheet type not initially set in the image forming apparatus.

The first schedule setting unit (referred to steps S904 and S1205) sets the scheduling so that, when the second information is detected by the judging unit, the sheet type corresponding to the second information can be exchanged with the specific sheet type after accomplishing the printing of the sheet type corresponding to the second information.

The second schedule setting unit (refer to step S905, S906, S1206, and S1207) sets the scheduling so that, when the second information is not detected by the judging unit, a sheet type printed latest after accomplishing printing of the specific sheet type, among sheet types corresponding to the first information obtained by the first information acquiring unit, can be exchanged with the specific sheet type after accomplishing printing of the sheet type printed latest before starting the printing of the specific sheet type.

The schedule producing unit (refer to steps S901, S908-S909, S1201, and S1209-S1210) produces schedule information relating to the schedule set by the first schedule setting unit or the second schedule setting unit, by letting the first information acquiring unit, the judging unit, the first schedule setting unit, and the second schedule setting unit repeat the above-described operations every time the information acquiring unit renews the specific sheet according to the print order.

The instructing unit (refer to step S704, FIGS. 16 and 19) configured to instruct the sheet exchange according to the schedule information produced by the schedule producing unit.

With this arrangement, the first and second embodiments enable an operator to select a sheet type to be used latest among the sheet types required in the job as an exchange object, at the time or prior to a sheet cassette exchange request. Furthermore, the embodiment enables the operator to know the way of effectively exchanging the sheet cassettes considering the presence of any sheets (sheet types) no longer used in the job.

Furthermore, as a second mode of the present embodiment, the first information acquiring unit obtains, based on the print order information obtained by the information acquiring unit, information relating to the sheet (Y1, Y2, - - - , Yn) to be printed before starting printing of the specific sheet type not initially set in the image forming apparatus and then obtains, based on the obtained information, first information excluding a sheet type printed immediately before starting the printing of the specific sheet (refer to steps S1202 and S1203).

Thus, the scheduling can be set so as to prohibit immediate exchange of sheet cassettes.

Furthermore, as a third mode of the present embodiment, the schedule producing unit modifies the schedule set by the first schedule setting unit or the second schedule setting unit so as to equalize the exchange timing of plural sheet types (refer to the second embodiment).

With this arrangement, plural cassettes can be simultaneously exchanged.

Furthermore, as a fourth mode, the present embodiment provides an information processing apparatus including an order information acquiring unit, a final information setting unit, a first information acquiring unit, a judging unit, a first schedule setting unit, a second schedule setting unit, a schedule producing unit, and an instructing unit equivalent to those of the above-described image forming apparatus.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2005-112466 filed Apr. 8, 2005, which is hereby incorporated by reference herein in its entirety.

What is claimed is:

1. An image forming apparatus that performs print processing based on print job data transmitted from an information processing apparatus that can produce the print job data, comprising:

an information acquiring unit configured to obtain, based on the print job data, information relating to a sheet type required in the print processing and a print order of the required sheet type;

a judging unit configured to determine whether the required sheet type obtained by the information acquiring unit is initially set in the image forming apparatus;

a decision unit configured to decide, based on the print order of the required sheet type obtained by the information acquiring unit, exchange object information relating to a sheet type later used but not initially set in the image forming apparatus, responsive to the judging unit determining that the required sheet type is not initially set in the image forming apparatus; and a display unit configured to display information relating to exchange processing for the sheet type later used but not initially set in the image forming apparatus, based on the exchange object information decided by the decision unit.

2. The image forming apparatus according to claim 1, wherein the information displayed by the display unit includes information relating to timing for exchanging the sheet type later used but not initially set in the image forming apparatus with the sheet type initially set in the image forming apparatus.

3. The image forming apparatus according to claim 1, further comprising:
a final information setting unit configured to set information relating to a sheet type finally set in the image forming apparatus, based on the print order of the required sheet type obtained by the information acquiring unit, responsive to the judging unit determining that the required sheet type is not initially set in the image forming apparatus;
a first information acquiring unit configured to obtain first information relating to a sheet type to be printed before starting printing of the sheet type later used but not initially set in the image forming apparatus; and
a second judging unit configured to determine, based on the first information obtained by the first information acquiring unit, whether there is second information relating to a sheet type which is not the sheet type corresponding to the information set by the final information setting unit and is no longer used after accomplishing the printing of the sheet type not initially set in the image forming apparatus,
wherein the decision unit decides, when the second information is detected by the second judging unit, the sheet type corresponding to the second information as the exchange object exchanged with the sheet type not initially set in the image forming apparatus after accomplishing the printing of the sheet corresponding to the second information.

4. The image forming apparatus according to claim 3, wherein the decision unit decides, when the second information is not detected by the second judging unit, a sheet type printed latest after accomplishing printing of the sheet type not initially set in the image forming apparatus as the exchange object exchanged with the sheet type not initially set in the image forming apparatus, among sheet types corresponding to the first information obtained by the first information acquiring unit, after accomplishing printing of the sheet type printed latest before starting the printing of the sheet type not initially set in the image forming apparatus.

5. The image forming apparatus according to claim 1, wherein the decision unit obtains, based on the print order of the required sheet type obtained by the information acquiring unit, information relating to sheet types printed before starting printing of the sheet type not initially set in the image forming apparatus, excludes information relating to a sheet type printed immediately before starting printing of the sheet type not initially set in the image forming apparatus, and decides a sheet exchange object among non-excluded sheet types.

6. The image forming apparatus according to claim 1, wherein the decision unit decides, at a predetermined timing, information relating to exchange of a plurality of sheet types not initially set in the image forming apparatus.

7. The image forming apparatus according to claim 1, wherein the print job data includes data on use of a plurality of sheet types.

8. The image forming apparatus according to claim 1, wherein the exchange object information relating to the sheet type later used but not initially set in the image forming apparatus displayed on the display unit includes information on a paper feeding cassette for storing the sheet type initially set in the image forming apparatus or the sheet type later used but not initially set in the image forming apparatus.

9. An image forming method for an image forming apparatus that performs print processing based on print job data transmitted from an information processing apparatus that can produce the print job data, comprising the following steps:
an information acquiring step of obtaining, based on the print job data, information relating to a sheet type required in the print processing and a print order of the required sheet type;
a judging step of determining whether the required sheet type obtained in the information acquiring step is initially set in the image forming apparatus;
a decision step of deciding, based on the print order of the required sheet type obtained in the information acquiring step, exchange object information relating to a sheet type later used but not initially set in the image forming apparatus, responsive to determining in the judging step that the required sheet type is not initially set in the image forming apparatus; and
a displaying step of displaying information relating to exchange processing for the sheet type later used but not initially set in the image forming apparatus, based on the exchange object information decided in the decision step.

10. The image forming method according to claim 9, wherein the information displayed in the displaying step includes information relating to timing for exchanging the sheet type later used but not initially set in the image forming apparatus with the sheet type initially set in the image forming apparatus.

11. The image forming method according to claim 9, further comprising:
a final information setting step of setting information relating to a sheet type finally set in the image forming apparatus, based on the print order of the required sheet type obtained in the information acquiring step, responsive to determining in the judging step that the required sheet type is not initially set in the image forming apparatus;
a first information acquiring step of obtaining first information relating to a sheet type to be printed before starting printing of the sheet type later used but not initially set in the image forming apparatus; and
a second judging step of determining, based on the first information obtained in the first information acquiring step, whether there is second information relating to a sheet type which is not the sheet type corresponding to the information set in the final information setting step and is no longer used after accomplishing the printing of the sheet type not initially set in the image forming apparatus,
wherein the decision step includes deciding, when the second information is detected in the second judging step, the sheet type corresponding to the second information as the exchange object exchanged with the sheet type not initially set in the image forming apparatus after accomplishing the printing of the sheet corresponding to the second information.

12. The image forming method according to claim 11, wherein the decision step includes deciding, when the second information is not detected by the second judging step, a sheet type printed latest after accomplishing printing of the sheet type not initially set in the image forming apparatus as the exchange object exchanged with the sheet type not initially set in the image forming apparatus, among sheet types corresponding to the first information obtained in the first information acquiring step, after accomplishing printing of the sheet type printed latest before starting the printing of the sheet type not initially set in the image forming apparatus.

13. The image forming method according to claim 9, wherein the decision step includes obtaining, based on the print order of the required sheet type obtained in the information acquiring step, information relating to sheet types printed before starting printing of the sheet type not initially set in the image forming apparatus, excluding information relating to a sheet type printed immediately before starting printing of the sheet type not initially set in the image forming apparatus, and deciding a sheet exchange object among non-excluded sheet types.

14. The image forming method according to claim 9, wherein the decision step includes deciding, at a predetermined timing, information relating to exchange of a plurality of sheet types not initially set in the image forming apparatus.

15. The image forming method according to claim 9, wherein the print job data include data on use of a plurality of sheet types.

16. The image forming method according to claim 9, wherein the exchange object information relating to the sheet type later used but not initially set in the image forming apparatus displayed in the displaying step includes information on a paper feeding cassette for storing the sheet type initially set in the image forming apparatus or the sheet type later used but not initially set in the image forming apparatus.

17. A computer-readable medium having stored thereon a computer program comprising program code having computer-executable program instructions processible, in an image forming apparatus that performs print processing based on print job data transmitted from an information processing apparatus that can produce the print job data, to execute the image forming method according to claim 9.

18. An information processing apparatus that can produce print job data processible by an image forming apparatus, comprising:
    an information acquiring unit configured to obtain, based on the print job data, information relating to a sheet type required in the print processing and a print order of the required sheet type;
    a judging unit configured to determine whether the required sheet type obtained by the information acquiring unit is initially set in the image forming apparatus;
    a decision unit configured to decide, based on the print order of the required sheet type obtained by the information acquiring unit, exchange object information relating to a sheet type later used but not initially set in the image forming apparatus, responsive to the judging unit determining that the required sheet type is not initially set in the image forming apparatus; and
    a display unit configured to display information relating to exchange processing for the sheet type later used but not initially set in the image forming apparatus, based on the exchange object information decided by the decision unit.

19. The information processing apparatus according to claim 18, wherein the information displayed by the display unit includes information relating to timing for exchanging the sheet type later used but not initially set in the image forming apparatus with the sheet type initially set in the image forming apparatus.

20. The information processing apparatus according to claim 18, further comprising:
    a final information setting unit configured to set information relating to a sheet type finally set in the image forming apparatus, based on the print order of the required sheet type obtained by the information acquiring unit, responsive to the judging unit determining that the required sheet type is not initially set in the image forming apparatus;
    a first information acquiring unit configured to obtain first information relating to a sheet type to be printed before starting printing of the sheet type later used but not initially set in the image forming apparatus; and
    a second judging unit configured to determine, based on the first information obtained by the first information acquiring unit, whether there is second information relating to a sheet type which is not the sheet type corresponding to the information set by the final information setting unit and is no longer used after accomplishing the printing of the sheet type not initially set in the image forming apparatus,
    wherein the display unit displays, when the second information is detected by the second judging unit, information relating to exchange of the sheet type corresponding to the second information and the sheet type not initially set in the image forming apparatus after accomplishing the printing of the sheet corresponding to the second information.

21. The information processing apparatus according to claim 20, wherein the display unit displays, when the second information is not detected by the second judging unit, a sheet type printed latest after accomplishing printing of the sheet type not initially set in the image forming apparatus as the exchange object exchanged with the sheet type not initially set in the image forming apparatus, among sheet types corresponding to the first information obtained by the first information acquiring unit, after accomplishing printing of the sheet type printed latest before starting the printing of the sheet type not initially set in the image forming apparatus.

22. The information processing apparatus according to claim 18, wherein the display unit displays sheet exchange information, based on the print order of the required sheet type obtained by the information acquiring unit, by obtaining information relating to sheet types printed before starting printing of the sheet type not initially set in the image forming apparatus and excluding information relating to a sheet type printed immediately before starting printing of the sheet type not initially set in the image forming apparatus.

23. The information processing apparatus according to claim 18, wherein the display unit displays, at a predetermined timing, information relating to exchange of a plurality of sheet types not initially set in the image forming apparatus.

24. The information processing apparatus according to claim 18, wherein the print job data include data on use of a plurality of sheet types.

25. The information processing apparatus according to claim 18, wherein the exchange object information relating to the sheet type later used but not initially set in the image forming apparatus displayed on the display unit includes information relating to a cassette for storing the sheet type initially set in the image forming apparatus or the sheet type later used but not initially set in the image forming apparatus.

26. An information processing method for an information processing apparatus that can produce print job data processible by in image forming apparatus, comprising the following steps:

an information acquiring step of obtaining, based on the print job data, information relating to a sheet type required in the print processing and a print order of the required sheet type;

a judging step of determining whether the required sheet type obtained in the information acquiring step is initially set in the image forming apparatus;

a decision step of deciding, based on the print order of the required sheet type obtained in the information acquiring step, exchange object information relating to a sheet type later used but not initially set in the image forming apparatus, responsive to determining in the judging step that the required sheet type is not initially set in the image forming apparatus; and a displaying step of displaying information relating to exchange processing for the sheet type later used but not initially set in the image forming apparatus, based on the exchange object information decided in the decision step.

27. The information processing method according to claim 26, wherein the information displayed in the displaying step includes information relating to timing for exchanging the sheet type later used but not initially set in the image forming apparatus with the sheet type initially set in the image forming apparatus.

28. The information processing method according to claim 26, further comprising:

a final information setting step of setting information relating to a sheet type finally set in the image forming apparatus, based on the print order of the required sheet type obtained in the information acquiring step, responsive to determining in the judging step that the required sheet type is not initially set in the image forming apparatus;

a first information acquiring step of obtaining first information relating to a sheet type to be printed before starting printing of the sheet type later used but not initially set in the image forming apparatus; and a second judging step of determining, based on the first information obtained in the first information acquiring step, whether there is second information relating to a sheet type which is not the sheet type corresponding to the information set in the final information setting step and is no longer used after accomplishing the printing of the sheet type not initially set in the image forming apparatus, wherein the displaying step includes displaying, when the second information is detected in the second judging step, information relating to exchange of the sheet type corresponding to the second information and the sheet type not initially set in the image forming apparatus after accomplishing the printing of the sheet corresponding to the second information.

29. The information processing method according to claim 28, wherein the displaying step includes displaying, when the second information is not detected by the second judging step, a sheet type printed latest after accomplishing printing of the sheet type not initially set in the image forming apparatus as the exchange object exchanged with the sheet type not initially set in the image forming apparatus, among sheet types corresponding to the first information obtained in the first information acquiring step, after accomplishing printing of the sheet type printed latest before starting the printing of the sheet type not initially set in the image forming apparatus.

30. The information processing method according to claim 26, wherein the displaying step includes displaying sheet exchange information, based on the print order of the required sheet type obtained in the information acquiring step, by obtaining information relating to sheet types printed before starting printing of the sheet type not initially set in the image forming apparatus and excluding information relating to a sheet type printed immediately before starting printing of the sheet type not initially set in the image forming apparatus.

31. The information processing method according to claim 26, wherein the displaying step includes displaying, at predetermined timing, information relating to exchange of a plurality of sheet types not initially set in the image forming apparatus.

32. The information processing method according to claim 26, wherein the print job data include data on use of a plurality of sheet types.

33. The information processing method according to claim 26, wherein the exchange object information relating to the sheet type later used but not initially set in the image forming apparatus displayed in the displaying step includes information relating to a cassette for storing the sheet type initially set in the image forming apparatus or the sheet type later used but not initially set in the image forming apparatus.

34. A display control apparatus that can display sheet exchange instructions of an image forming apparatus that can set a plurality of sheet types, comprising:

a first acquiring unit configured to acquire, based on print job data transmitted from an information processing apparatus, a print order of a required sheet type;

a second acquiring unit configured to acquire sheet type information that is set in the image forming apparatus;

a judging unit configured to determine, based on the print order of the required sheet type acquired by the first acquiring unit and the sheet type information acquired by the second acquiring unit, whether a new sheet type is set in the image forming apparatus;

a selection unit configured to select, based on the print order of the required sheet type acquired by the first acquiring unit, a sheet type to be exchanged for the new sheet type from a sheet type not used when the new sheet type is set, in a case where the judging unit determines that the new sheet type is to be set in the image forming apparatus; and a displaying control unit configured to display exchanging instruction of the sheet type selected by the selection unit and the new sheet type.

35. A display control apparatus that displays sheet exchange instructions of an image forming apparatus that can set a plurality of sheet types, comprising:

a first acquiring unit configured to acquire, based on print job data transmitted from an information processing apparatus, information relating to a print order of a required sheet type;

a second acquiring unit configured to acquire sheet type information that is set in the image forming apparatus;

a judging unit configured to determine, based on the print order of the required sheet type acquired by the first acquiring unit and the sheet type information acquired by the second acquiring unit, whether a new sheet type is set in the image forming apparatus;

a specifying unit configured to specify, based on the print order of the required sheet type acquired by the first acquiring unit, a sheet type printed latest after using the new sheet type or a sheet type not used after using the new sheet type, in a case where the judging unit determines that the new sheet type is to be set in the image forming apparatus; and a displaying control unit configured to display exchanging instruction of the sheet type specified by the specifying unit and the new sheet type.

36. A display control method for a display control apparatus that displays sheet exchange instructions of an image forming apparatus that can set a plurality of sheet types, comprising the following steps:
- a first acquiring step of acquiring, based on print job data transmitted from an information processing apparatus, a print order of a required sheet type;
- a second acquiring step of acquiring sheet type information that is set in the image forming apparatus;
- a judging step of determining, based on the print order of the required sheet type acquired in the first acquiring step and the sheet type information acquired in the second acquiring step, whether a new sheet type is set in the image forming apparatus;
- a selection step of selecting, based on the print order of the required sheet type acquired in the first acquiring step, a sheet type to be exchanged for a new sheet type from a sheet type not used when the new sheet type is set, in a case where it is determined in the judging step that the new sheet type is to be set in the image forming apparatus; and
- a displaying control step of displaying exchanging instruction of the sheet type selected in the selection step and the new sheet type.

37. A computer-readable medium having stored thereon a program comprising program code having computer-executable instructions that are readable by a display control apparatus that displays sheet exchange instructions of an image forming apparatus that can set a plurality of sheet types, to execute the display control method according to claim 36.

38. A display control method for a display control apparatus that displays sheet exchange instructions of an image forming apparatus that can set a plurality of sheet types, comprising the following steps:
- a first acquiring step of acquiring, based on print job data transmitted from an information processing apparatus, a print order of a required sheet type;
- a second acquiring step of acquiring sheet type information that is set in the image forming apparatus;
- a judging step of determining, based on the print order of the required sheet type acquired in the first acquiring step and the sheet type information acquired in the second acquiring step, whether a new sheet type is set in the image forming apparatus;
- a specifying step of specifying, based on the print order of the required sheet type acquired in the first acquiring step, a sheet type printed latest after using the new sheet type or a sheet type not used after using the new sheet type, in a case where said it is determined in the judging step that the new sheet type is to be set in the image forming apparatus; and
- a displaying control step of displaying exchanging instruction of the sheet type specified in the specifying step and the new sheet type.

39. A computer-readable medium having stored thereon a program comprising program code having computer-executable instructions that are readable by a display control apparatus that displays sheet exchange instructions of an image forming apparatus that can set a plurality of sheet types, to execute the display control method according to claim 38.

* * * * *